(12) United States Patent
Santhanam et al.

(10) Patent No.: US 12,101,843 B2
(45) Date of Patent: Sep. 24, 2024

(54) TRIGGERING USER EQUIPMENT (UE) ASSISTANCE INFORMATION BASED ON MOBILITY AND WAKE UP SIGNAL (WUS) CONFIGURATION

(71) Applicant: QUALCOMM Incorporated, San Diego, CA (US)

(72) Inventors: Arvind Vardarajan Santhanam, San Diego, CA (US); Vanitha Aravamudhan Kumar, San Diego, CA (US); Kuo-Chun Lee, San Diego, CA (US); Satashu Goel, San Diego, CA (US); Shailesh Maheshwari, San Diego, CA (US); Daniel Amerga, San Diego, CA (US); Vikram Singh, San Diego, CA (US); Vishal Dalmiya, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 422 days.

(21) Appl. No.: 17/592,650

(22) Filed: Feb. 4, 2022

(65) Prior Publication Data
US 2023/0254934 A1      Aug. 10, 2023

(51) Int. Cl.
*H04W 76/28*      (2018.01)
*H04W 24/08*      (2009.01)
(Continued)

(52) U.S. Cl.
CPC ........... *H04W 76/28* (2018.02); *H04W 24/08* (2013.01); *H04W 52/0229* (2013.01); *H04W 72/51* (2023.01)

(58) Field of Classification Search
None
See application file for complete search history.

(56) References Cited

U.S. PATENT DOCUMENTS

2019/0320490 A1   10/2019   Liu et al.

FOREIGN PATENT DOCUMENTS

| WO | WO-2021142565 A1 | 7/2021 | |
|----|------------------|--------|---|
| WO | WO-2021204548 A1 * | 10/2021 | ............ H04W 60/04 |

OTHER PUBLICATIONS

International Search Report and Written Opinion—PCT/US2023/060753—ISA/EPO—May 11, 2023.
(Continued)

*Primary Examiner* — Ayanah S George
(74) *Attorney, Agent, or Firm* — Holland & Hart LLP

(57) ABSTRACT

Methods, systems, and devices for wireless communications are described. A system may support techniques for triggering user equipment (UE) assistance information (UAI) based on mobility, wake up signal (WUS) configuration, or both. In some cases, a UE may communicate with a network node (e.g., a base station) on a first channel according to a discontinuous reception (DRX) configuration. The UE may determine that a speed of the UE satisfies a mobility threshold and may transmit UAI requesting one or more updated DRX configuration parameters based on the speed of the UE satisfying the mobility threshold. Additionally or alternatively, the UE may receive signaling configuring the UE to monitor for WUSs and may transmit UAI requesting one or more updated DRX configuration parameters based on the WUS configuration. The UE may receive control signaling configuring the DRX configuration with the one or more requested parameters in response to the UAI.

20 Claims, 12 Drawing Sheets

(51) Int. Cl.
*H04W 52/02* (2009.01)
*H04W 72/51* (2023.01)

(56) References Cited

OTHER PUBLICATIONS

Qualcomm Incorporated: "UE Adaptation to the Traffic and UE Power Consumption Characteristics", 3GPP TSG-RAN WG1 Ad-Hoc Meeting 1901, R1-1900911, 3rd Generation Partnership Project, Mobile Competence Centre, 650, Route Des Lucioles, F-06921 Sophia-Antipolis Cedex, France, vol. RAN WG1, No. Taipei, Taiwan, Jan. 21, 2019-Jan. 25, 2019, 24 Pages, Jan. 20, 2019, XP051593757, Chapters 1. 2, sections 1-8, pp. 1-14, p. 14-p. 18, figure 1, p. 22-p. 23.

ZTE: "Discussion on Potential Techniques for UE Power Saving", 3GPP TSG RAN WG1 Meeting #96, R1-1902031, 3rd Generation Partnership Project, Mobile Competence Centre, 650, Route Des Lucioles, F-06921 Sophia-Antipolis, vol. RAN WG1, No. Athens, Greece, Feb. 25, 2019-Mar. 1, 2019, Feb. 16, 2019, 22 Pages, XP051599727, p. 8, paragraph 3.5—p. 9, Paragraph 3.5, p. 15, paragraph 4.3.2—p. 16, paragraph 4.3.2, figures 8, 13, paragraph 1, paragraph 3.

\* cited by examiner

On Duration 510

TRIGGERING USER EQUIPMENT (UE) ASSISTANCE INFORMATION BASED ON MOBILITY AND WAKE UP SIGNAL (WUS) CONFIGURATION

FIELD OF TECHNOLOGY

The following relates to wireless communications, including triggering user equipment (UE) assistance information (UAI) based on mobility and wake up signal (WUS) configuration.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some systems, a wireless device may support discontinuous reception (DRX) and operate according to a DRX cycle. For example, a network node may configure the UE with a set of parameters associated with the DRX cycle, which may be referred to as a DRX configuration. The UE may cycle between an on duration, in which the UE may monitor for transmissions, and an off duration, in which the UE nay refrain from monitoring for transmissions, based on the DRX configuration. In some cases, however, the current DRX configuration at the UE may result in inefficiencies based on current operating conditions for the UE. For example, frequent on durations (e.g., more frequent than a first threshold) may lead to significant battery usage and power overhead at the UE in some operating conditions, while infrequent on durations (e.g., less frequent than a second threshold) may result in relatively unreliable wireless communications for the UE in some other operating conditions.

SUMMARY

The described techniques relate to improved methods, systems, devices, and apparatuses that support triggering user equipment (UE) assistance information (UAI) based on mobility and wake up signal (WUS) configuration. Generally, the described techniques enable a wireless device, such as a UE, to trigger transmission of control signaling requesting one or more parameters to update a discontinuous reception (DRX) configuration based on mobility of the UE, a WUS configuration for the UE, or both. For example, a UE may communicate with a network node (e.g., a base station, component of a base station, or other network entity) on a first channel according to a DRX configuration, which may include a parameter associated with a first DRX long cycle (e.g., defining a periodicity of on durations for the DRX cycle if the UE is operating according to the long cycle).

The UE may measure conditions for one or more other channels, such as a second channel, following an active period of DRX—which may correspond to an on duration—to determine communication performance of the one or more other channels. In some cases, the UE may perform a handover procedure to the second channel based on the measurements. For example, a value for a channel metric associated with the second channel may be greater than a value for the channel metric associated with the first channel, and the UE may trigger the handover procedure based on the comparison. In some cases, such as high mobility applications, the UE may experience relatively frequent changes in communication performance due to frequent signal changes corresponding to the relatively high speed of the UE (e.g., because the UE is quickly moving through the coverage areas of one or more cells). Accordingly, the UE may fail to measure the second channel at a periodicity that can account for the rapid changes, potentially resulting in decreased communication performance. In such cases, the UE may detect that a speed of the UE satisfies a mobility threshold and may trigger a transmission of control signaling (e.g., UAI) requesting one or more parameters to update the DRX configuration. In some examples, the UE may determine that the speed of the UE satisfies the mobility threshold based on a doppler frequency shift for the UE satisfying a threshold frequency shift. In some other examples, the UE may determine that the speed of the UE satisfies the mobility threshold based on a rate of cell changes for the UE satisfying a threshold cell change rate.

Additionally or alternatively, the network node may configure the UE to monitor for WUSs. That is, the network node may configure the UE to receive WUSs indicating an upcoming transmission, or lack of upcoming transmission, in the next DRX on duration. If the UE fails to receive a WUS—or receives a WUS indicating that the subsequent on duration does not include a downlink transmission—the UE may refrain from waking up in the subsequent on duration, improving power savings at the UE. The UE may identify that the UE is configured for WUS monitoring and may trigger a transmission of control signaling (e.g., UAI) requesting one or more parameters to update the DRX configuration based on the WUS configuration. For example, the UE may request a value for a second DRX long cycle that is shorter than the first DRX long cycle. That is, because the UE may refrain from waking up during a subset of on durations, the UE may support relatively more frequent on durations without exceeding a power overhead threshold for the UE. In some cases, the UE may determine the one or more parameters to request based on a quality of service delay threshold.

A method for wireless communications at a UE is described. The method may include communicating with a network node on a first channel according to a discontinuous reception configuration, determining that a speed of the UE satisfies a mobility threshold, transmitting, to the network node, UE assistance information requesting one or more parameters to update the discontinuous reception configuration in response to determining that the speed satisfies the mobility threshold, and receiving, from the network node and in response to the UE assistance information, signaling configuring the discontinuous reception configuration with the requested one or more parameters.

An apparatus for wireless communications at a UE is described. The apparatus may include a processor, memory coupled with the processor, and instructions stored in the memory. The instructions may be executable by the processor to cause the apparatus to communicate with a network node on a first channel according to a discontinuous reception configuration, determine that a speed of the UE satisfies a mobility threshold, transmit, to the network node, UE assistance information requesting one or more parameters to update the discontinuous reception configuration in response to determining that the speed satisfies the mobility threshold, and receive, from the network node and in response to the UE assistance information, signaling configuring the discontinuous reception configuration with the requested one or more parameters.

Another apparatus for wireless communications at a UE is described. The apparatus may include means for communicating with a network node on a first channel according to a discontinuous reception configuration, means for determining that a speed of the UE satisfies a mobility threshold, means for transmitting, to the network node, UE assistance information requesting one or more parameters to update the discontinuous reception configuration in response to determining that the speed satisfies the mobility threshold, and means for receiving, from the network node and in response to the UE assistance information, signaling configuring the discontinuous reception configuration with the requested one or more parameters.

A non-transitory computer-readable medium storing code for wireless communications at a UE is described. The code may include instructions executable by a processor to communicate with a network node on a first channel according to a discontinuous reception configuration, determine that a speed of the UE satisfies a mobility threshold, transmit, to the network node, UE assistance information requesting one or more parameters to update the discontinuous reception configuration in response to determining that the speed satisfies the mobility threshold, and receive, from the network node and in response to the UE assistance information, signaling configuring the discontinuous reception configuration with the requested one or more parameters.

In some examples of the method, apparatuses, and non-transitory computer-readable medium described herein, the discontinuous reception configuration includes a periodicity of on durations and the method, apparatuses, and non-transitory computer-readable medium may include further operations, features, means, or instructions for measuring a respective channel metric for one or more other channels based on the periodicity of the on durations for the discontinuous reception configuration.

In some examples of the method, apparatuses, and non-transitory computer-readable medium described herein, the discontinuous reception configuration includes a first time duration between starts of consecutive on durations and the one or more parameters indicates a second time duration between the starts of the consecutive on durations that is less than the first time duration and the method, apparatuses, and non-transitory computer-readable medium may include further operations, features, means, or instructions for increasing a rate of performing the measuring based on the second time duration being less than the first time duration.

In some examples of the method, apparatuses, and non-transitory computer-readable medium described herein, the discontinuous reception configuration includes a first time duration between starts of consecutive on durations and the one or more parameters indicates a second time duration between the starts of the consecutive on durations that is greater than the first time duration or refrains from indicating a time duration between the starts of the consecutive on durations and the method, apparatuses, and non-transitory computer-readable medium may include further operations, features, means, or instructions for decreasing a rate of performing the measuring based on the second time duration being greater than the first time duration or the one or more parameters refraining from indicating the time duration between the starts of the consecutive on durations.

In some examples of the method, apparatuses, and non-transitory computer-readable medium described herein, the measuring may include operations, features, means, or instructions for measuring the respective channel metric for one or more other frequencies, one or more other cells, one or more other radio access technologies, or a combination thereof.

Some examples of the method, apparatuses, and non-transitory computer-readable medium described herein may further include operations, features, means, or instructions for performing a handover procedure to a second network node based on the measuring.

In some examples of the method, apparatuses, and non-transitory computer-readable medium described herein, determining that the speed of the UE satisfies the mobility threshold may include operations, features, means, or instructions for determining that a doppler frequency shift for the UE satisfies a threshold frequency shift.

In some examples of the method, apparatuses, and non-transitory computer-readable medium described herein, determining that the speed of the UE satisfies the mobility threshold may include operations, features, means, or instructions for determining that a rate of cell changes for the UE satisfies a threshold cell change rate.

In some examples of the method, apparatuses, and non-transitory computer-readable medium described herein, the one or more parameters includes a preferred value for a discontinuous reception long cycle of the discontinuous reception configuration, the discontinuous reception long cycle indicating a time duration between starts of consecutive on durations of the discontinuous reception configuration if the UE has failed to receive data for a threshold quantity of preceding on durations.

In some examples of the method, apparatuses, and non-transitory computer-readable medium described herein, the discontinuous reception configuration includes a first value for a discontinuous reception long cycle and the method, apparatuses, and non-transitory computer-readable medium may include further operations, features, means, or instructions for determining a second value for the discontinuous reception long cycle that is shorter than the first value for the discontinuous reception long cycle based on the speed of the UE being greater than a first mobility threshold, where the one or more parameters include at least the second value for the discontinuous reception long cycle.

In some examples of the method, apparatuses, and non-transitory computer-readable medium described herein, the discontinuous reception configuration includes a first value for a discontinuous reception long cycle and the method, apparatuses, and non-transitory computer-readable medium may include further operations, features, means, or instructions for determining an empty value or a second value for the discontinuous reception long cycle that is longer than the first value for the discontinuous reception long cycle based on the speed of the UE being less than a second mobility threshold, where the one or more parameters include at least the empty value or the second value for the discontinuous reception long cycle.

A method for wireless communications at a UE is described. The method may include receiving, from a network node, first signaling configuring the UE to monitor for wake up signals for a discontinuous reception configuration, transmitting, to the network node, UE assistance information requesting one or more parameters to update the discontinuous reception configuration in response to the first signaling configuring the UE to monitor for the wake up signals, and receiving, from the network node and in response to the UE assistance information, second signaling configuring the discontinuous reception configuration with the requested one or more parameters.

An apparatus for wireless communications at a UE is described. The apparatus may include a processor, memory coupled with the processor, and instructions stored in the memory. The instructions may be executable by the processor to cause the apparatus to receive, from a network node, first signaling configuring the UE to monitor for wake up signals for a discontinuous reception configuration, transmit, to the network node, UE assistance information requesting one or more parameters to update the discontinuous reception configuration in response to the first signaling configuring the UE to monitor for the wake up signals, and receive, from the network node and in response to the UE assistance information, second signaling configuring the discontinuous reception configuration with the requested one or more parameters.

Another apparatus for wireless communications at a UE is described. The apparatus may include means for receiving, from a network node, first signaling configuring the UE to monitor for wake up signals for a discontinuous reception configuration, means for transmitting, to the network node, UE assistance information requesting one or more parameters to update the discontinuous reception configuration in response to the first signaling configuring the UE to monitor for the wake up signals, and means for receiving, from the network node and in response to the UE assistance information, second signaling configuring the discontinuous reception configuration with the requested one or more parameters.

A non-transitory computer-readable medium storing code for wireless communications at a UE is described. The code may include instructions executable by a processor to receive, from a network node, first signaling configuring the UE to monitor for wake up signals for a discontinuous reception configuration, transmit, to the network node, UE assistance information requesting one or more parameters to update the discontinuous reception configuration in response to the first signaling configuring the UE to monitor for the wake up signals, and receive, from the network node and in response to the UE assistance information, second signaling configuring the discontinuous reception configuration with the requested one or more parameters.

In some examples of the method, apparatuses, and non-transitory computer-readable medium described herein, the discontinuous reception configuration includes a first value for a discontinuous reception long cycle and the method, apparatuses, and non-transitory computer-readable medium may include further operations, features, means, or instructions for determining a second value for the discontinuous reception long cycle that is shorter than the first value for the discontinuous reception long cycle based on the UE being configured to monitor for the wake up signals, where the one or more parameters include at least the second value for the discontinuous reception long cycle and where the discontinuous reception long cycle indicates a time duration between starts of consecutive on durations of the discontinuous reception configuration if the UE has failed to receive data for a threshold quantity of preceding on durations.

Some examples of the method, apparatuses, and non-transitory computer-readable medium described herein may further include operations, features, means, or instructions for receiving third signaling configuring the UE to refrain from monitoring for the wake up signals for the discontinuous reception configuration, determining an empty value or a third value for the discontinuous reception long cycle that is longer than the second value for the discontinuous reception long cycle based on the UE being configured to refrain from monitoring for the wake up signals, and transmitting second UE assistance information requesting one or more second parameters to update the discontinuous reception configuration in response to the third signaling configuring the UE to refrain from monitoring for the wake up signals, the one or more second parameters including at least the empty value or the third value for the discontinuous reception long cycle.

Some examples of the method, apparatuses, and non-transitory computer-readable medium described herein may further include operations, features, means, or instructions for determining a value for a discontinuous reception long cycle of the discontinuous reception configuration based on a quality of service delay threshold, where the one or more parameters include at least the value for the discontinuous reception long cycle.

Some examples of the method, apparatuses, and non-transitory computer-readable medium described herein may further include operations, features, means, or instructions for determining the quality of service delay threshold based on the UE being configured to monitor for the wake up signals.

Some examples of the method, apparatuses, and non-transitory computer-readable medium described herein may further include operations, features, means, or instructions for monitoring for a wake up signal prior to an on duration of the discontinuous reception configuration based on the UE being configured to monitor for the wake up signals, receiving the wake up signal based on the monitoring, and performing a wake up procedure for the on duration of the discontinuous reception configuration based on receiving the wake up signal.

Some examples of the method, apparatuses, and non-transitory computer-readable medium described herein may further include operations, features, means, or instructions for monitoring for a wake up signal prior to an on duration of the discontinuous reception configuration based on the UE being configured to monitor for the wake up signals, failing to receive the wake up signal based on the monitoring, and refraining from performing a wake up procedure for the on duration of the discontinuous reception configuration based on failing to receive the wake up signal.

DETAILED DESCRIPTION

Figure 1:
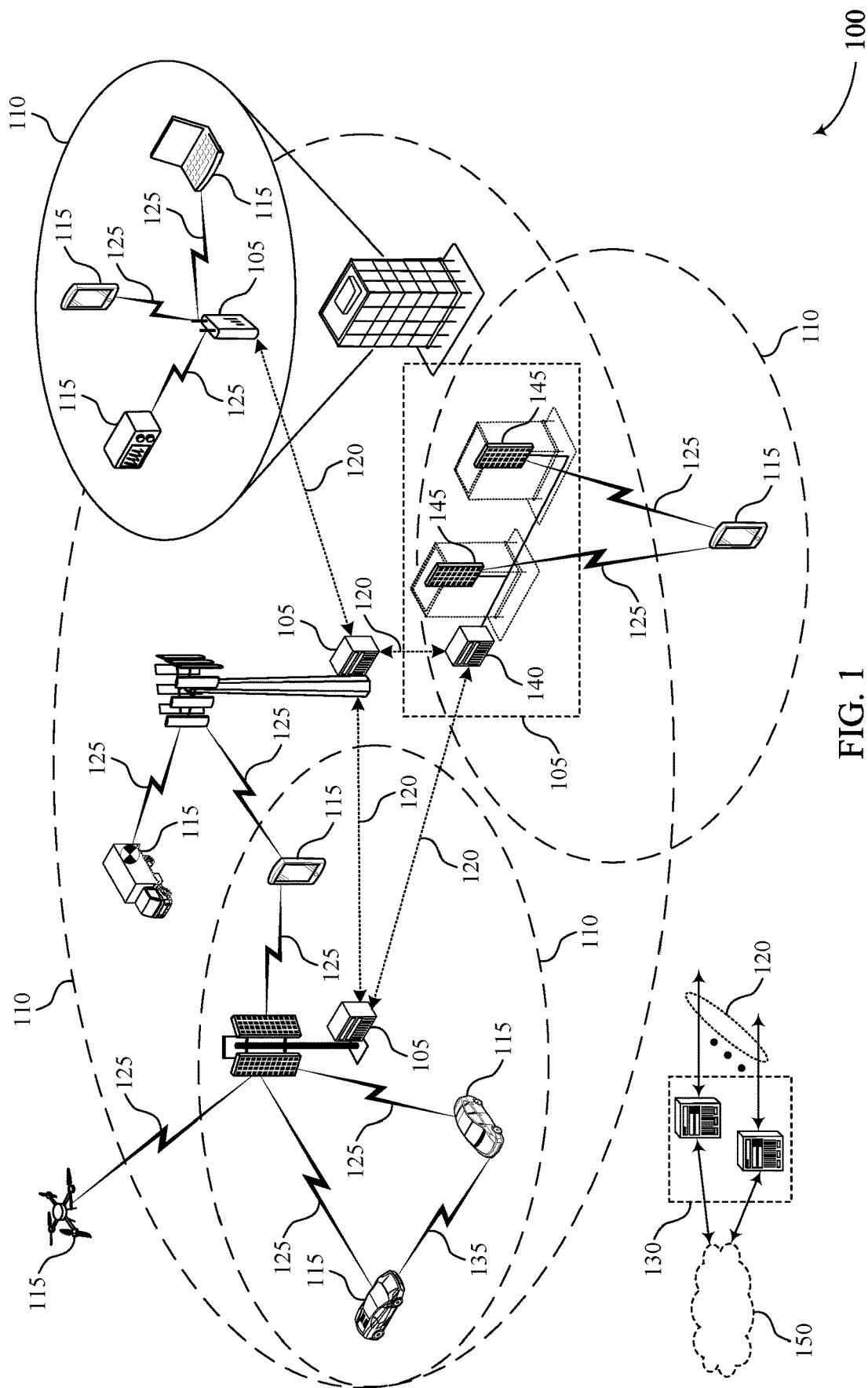
FIGS. 1 and 2 illustrate examples of wireless communications systems that support triggering user equipment (UE) assistance information (UAI) based on mobility and wake up signal (WUS) configuration in accordance with aspects of the present disclosure.

In some systems, a first wireless device, such as a user equipment (UE), may support discontinuous reception (DRX). As such, the UE may cycle between an on duration for a first period of time and an off duration for a second period of time, where the combination of the on duration and the off duration may be referred to as a DRX cycle. During the on duration, the UE may wake up and monitor for a transmission from a second wireless device, such as a network node (e.g., a base station, a component of a base station, or some other network entity), and may receive a transmission from the network node based on the monitoring. During the off duration, the UE may refrain from monitoring for a transmission from the network node and may conserve battery power by entering a low power or sleep mode. The network node may configure the UE with a set of parameters associated with the DRX cycle, which may include a parameter associated with the period of time between starts of consecutive on durations (e.g., a DRX cycle length). In some examples, the UE may support multiple DRX cycle lengths, including a short cycle (e.g., if the UE has recently communicated with the network) and a long cycle (e.g., if the UE has not received data from the network for a threshold period of time, which may be defined by a short cycle timer). However, in some cases, the DRX cycle length configured for the UE may result in inefficiencies based on other operating parameters or configurations associated with the UE.

Techniques described herein may support specific trigger conditions for triggering transmission of control signaling (e.g., UE assistance information (UAI)) by a UE to request one or more preferred parameters for a DRX configuration. In some cases, a first wireless device (e.g., a UE) communicating with a second wireless device (e.g., a network node) via a first channel may take measurements of one or more other channels following an active period of DRX, which may correspond to an on duration. For example, a wireless device communicating via a first channel may experience relatively poor communication performance (e.g., below a performance threshold) and may measure a second channel to determine the communication performance, indicated by a channel metric, of the second channel. In some cases, the communication performance of the second channel may be greater than the communication performance of the first channel, and the UE or network may trigger a handover of the communications from the first channel to the second channel. In some cases, such as high mobility applications, the UE may experience relatively frequent changes in communication performance from frequent signal changes due to the relatively high speed of the UE (e.g., due to the UE moving through coverage areas of one or more cells relatively quickly). Accordingly, the UE may fail to measure the second channel at a periodicity that can account for the rapid changes (e.g., the on durations may be too infrequent for the mobility conditions of the UE), potentially resulting in decreased communication performance. In such cases, the UE may detect that a speed of the UE satisfies a mobility threshold and may trigger transmission of control signaling (e.g., UAI) requesting one or more parameters to update the DRX configuration. For example, the UE may detect a speed that is greater than the mobility threshold, which may trigger the UE to transmit control signaling requesting a decrease in the period of time between starts of consecutive on durations (e.g., a long cycle) to increase the frequency at which the UE measures the one or more other channels. In some other cases, the UE may detect a speed that is slower than a mobility threshold, which may trigger the UE to transmit control signaling requesting an increase in the period of time between starts of consecutive on durations to reduce the frequency at which the UE measures the one or more other channels. Transmitting control signaling requesting one or more parameters to update the DRX configuration based on UE mobility may result in increased communication performance, decreased power consumption, or both depending on the current mobility conditions of the UE.

Additionally or alternatively, a wireless device, such as a UE, may receive a wake up signal (WUS) configuration from a second wireless device, such as a network node. That is, the network node may configure the UE to receive WUSs indicating an upcoming transmission, or lack of upcoming transmission, in the next DRX on duration. For example, the UE may monitor for a WUS prior to an on duration and may determine whether to wake up for the on duration based on whether the UE receives the WUS. As such, the UE may refrain from waking up and monitoring for downlink transmissions during one or more on durations if the UE fails to receive a WUS indicating an upcoming transmission. In some cases, the network node may configure the UE to monitor for WUSs, which may trigger the UE to transmit control signaling (e.g., UAI) requesting one or more parameters to update the DRX configuration. For example, the UE may identify that WUSs are configured and may transmit control signaling requesting a decrease in the period of time between starts of consecutive on durations (e.g., due to the power savings from WUS configuration, the UE may support more frequent potential on durations without exceeding a power overhead). Transmitting control signaling requesting one or more parameters to update the DRX configuration based on a WUS configuration may result in increased communication reliability due to the increased frequency of the on duration while maintaining a power overhead threshold due to the power savings from the WUSs.

Aspects of the disclosure are initially described in the context of wireless communications systems. Aspects of the disclosure are then described in the context of DRX configurations and process flows. Aspects of the disclosure are further illustrated by and described with reference to apparatus diagrams, system diagrams, and flowcharts that relate to triggering UAI based on mobility and WUS configuration.

FIG. 1 illustrates an example of a wireless communications system 100 that supports triggering UAI based on mobility and WUS configuration in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. For example, a base station 105 may be referred to as a network node, or a component of a base station 105 may be referred to as a network node. For example, the features described herein with respect to a base station 105 may be performed by multiple distributed network entities or devices referred to as network nodes, which may communicate via wired or wireless connections. The base stations 105 and the UEs 115 may wirelessly communicate via one or more communication links 125. Each base station 105 may provide a geographic coverage area 110 over which the UEs 115 and the base station 105 may establish one or more communication links 125. The geographic coverage area 110 may be an example of a geographic area over which a base station 105 and a UE 115 may support the communication of signals according to one or more radio access technologies.

The UEs 115 may be dispersed throughout a geographic coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, base station 105, entity of a core network 130, apparatus, device, or computing system configured to perform any techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different. Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information; and the second network node may refer to a second UE 115, a second base station 105, a second apparatus, a second device, or a second computing system.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The wireless communications system 100 may support triggering UAI based on mobility of a UE 115, a WUS configuration for a UE 115, or both. For example, a UE 115 may communicate with a base station 105 on a first channel according to a DRX configuration, which may include a parameter associated with a first DRX long cycle. In some cases, the UE 115 may determine that a speed of the UE 115 satisfies a mobility threshold and may transmit control signaling requesting one or more parameters to update the DRX configuration based on the UE 115 speed. For example, the UE 115 may determine that a speed of the UE 115 is greater than the mobility threshold and may transmit control signaling requesting a parameter associated with a second DRX long cycle, such that the duration of the second DRX long cycle is shorter than the duration of the first DRX long cycle. In some other cases, the base station 105 may configure the UE 115 to monitor for WUSs. The UE 115 may identify that the UE 115 is configured to monitor for WUSs and may transmit control signaling requesting one or more parameters to update the DRX configuration based on the WUS configuration. For example, the UE 115 may identify that the UE 115 is configured to monitor for WUSs and may trigger transmission of control signaling requesting a parameter associated with a third DRX long cycle, such that the duration of the third DRX long cycle is shorter than the duration of the first DRX long cycle.

Figure 2:
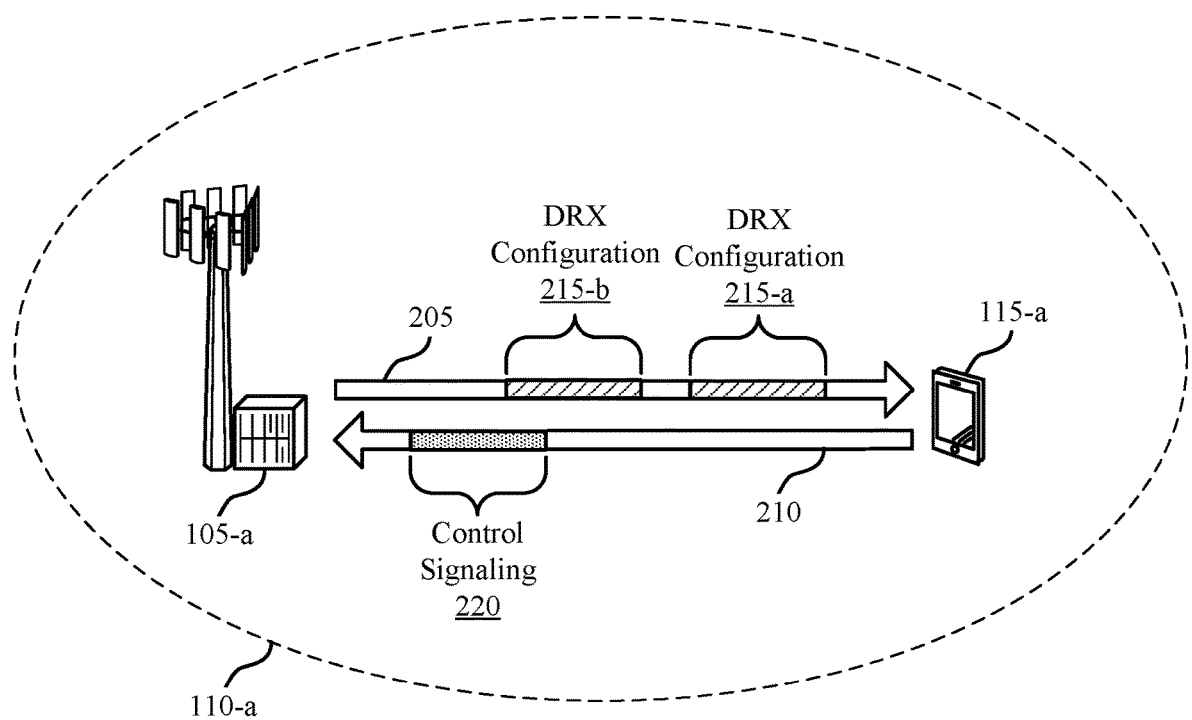

FIG. 2 illustrates an example of a wireless communications system 200 that supports triggering UAI based on mobility and WUS configuration in accordance with aspects of the present disclosure. In some examples, the wireless communications system 200 may implement aspects of a wireless communications system 100 and may include a UE 115-a and a base station 105-a, which may be examples of a UE 115 and a base station 105 and may communicate with one another within a coverage area 110-a as described above with reference to FIG. 1. For example, the base station 105-a may transmit downlink communications 205 to the UE 115-a via a communication link as described with reference to FIG. 1. The UE 115-a may transmit uplink communications 210 to the base station 105-a via the communication link. The UE 115-a may operate according to a DRX configuration and may monitor for specific triggers to send UAI to the base station 105-a. The UAI may request one or more updated DRX parameters to improve the DRX operations at the UE 115-a (e.g., improve battery life, reduce processing overhead, improve communication reliability, improve cell detection and monitoring).

In some systems, a first wireless device, such as a UE 115-a, may support connect mode discontinuous reception (DRX). As such, the UE 115-a may cycle between an on duration for a first period of time and an off duration for a second period of time, where the combination of one on duration and one off duration may be referred to as a DRX cycle. During the on duration, the UE 115-a may wake up and monitor for a transmission from a second wireless device, such as a base station 105-a (e.g., one or more network nodes). During the off duration, the UE 115-a may enter a sleep or idle mode in which the UE 115-a may refrain from monitoring for transmissions from the base station 105-a. In some cases, the base station 105-a may refrain from transmitting a signal to the UE 115-a during the on duration and the UE 115-a may return to the off duration after the on duration is complete. In some other cases, the base station 105-a may transmit a transmission to the UE 115-a during the on duration and the UE 115-a may receive the transmission from the base station 105-a based on the monitoring. In some examples, the UE 115-a may remain awake for at least a portion of the off duration to communicate with the base station 105-a (e.g., receive the downlink transmission, transmit an uplink transmission). The on duration and the period of time in which the UE 115-a receives a signal (e.g., the time window during which the UE 115-a is awake or otherwise in a powered-on state) may be referred to as an active period.

The base station 105-*a* may configure the UE 115-*a* with a set of parameters associated with the DRX cycle, which may be referred to as a DRX configuration 215-*a*. For example, the base station 105-*a* may configure the UE 115-*a* with a first parameter associated with a first period of time between starts of consecutive on durations (e.g., a periodicity of on durations), which may be referred to as a long cycle, and a second parameter associated with a second period of time between starts of consecutive on durations, which may be referred to as a short cycle, where the first period of time is longer than the second period of time. In some cases, the UE 115-*a* may transition between the long cycle and the short cycle. For example, the UE 115-*a* may receive a signal during an on duration and may operate according to the short cycle based on the receiving. The UE 115-*a* may continue to operate according to the short cycle as the UE 115-*a* continues to receive signaling during consecutive on durations. The UE 115-*a* may fall back—or otherwise transition—to operating according to the long cycle based on a lack of received signaling in a threshold quantity of preceding on durations (or for a threshold time, which may be defined by a short cycle timer). For example, the UE 115-*a* may operate according to the short cycle and may receive signaling during a first quantity of on durations. The UE 115-*a* may then fail to receive signaling during a second quantity of consecutive on durations, which may be greater than a threshold quantity. As such, the UE 115-*a* may transition from operating according to the short cycle to operating according to the long cycle. Additionally or alternatively, the UE 115-*a* may configure a timer (e.g., a short cycle timer) which may restart if the UE 115-*a* receives signaling from the base station 105-*a*. If the timer expires (e.g., indicating that the UE 115-*a* did not receive signaling from the base station 105-*a* at least for the length of the timer), the UE 115-*a* may transition from operating according to the short cycle to operating according to the long cycle. In some cases, the UE 115-*a* may operate according to the short cycle upon initial start up.

The DRX configuration 215-*a* may include multiple parameters defining aspects of the DRX cycle. The parameters may be associated with one or more of the short cycle, the long cycle, the threshold quantity of on durations (e.g., a short cycle timer), a duration in which the UE 115 remains on after reception of a signal (e.g., an inactivity timer), or some combination thereof.

In some cases, the UE 115-*a* may transmit control signaling 220 (e.g., UAI) to the base station 105-*a* requesting one or more preferred parameters to update the DRX configuration (e.g., preferredDRX-InactivityTimer, preferredDRX-LongCycle, preferredDRX-ShortCycle, preferredDRX-ShortCycleTimer, among others). In some cases, the base station 105-*a* may transmit control signaling to the UE 115-*a* to set up or release the UE 115-*a* from transmitting such control signaling 220 (e.g., UAI) requesting the one or more preferred parameters (e.g., using RRCReconfiguration signaling). The control signaling transmitted by the base station 105-*a* may include a timer (e.g., timer T346*a* configured via drx-PreferenceProhibitTimer). The timer may be associated with a time period in which the UE 115-*a* may refrain from transmitting control signaling requesting the one or more parameters.

Techniques described herein may support triggering of control signaling 220 (e.g., UAI) by the UE 115-*a* requesting one or more parameters to update a DRX configuration 215-*a*. The UE 115-*a* may communicate with the base station 105-*a* via a first channel and, in some cases, may measure one or more other channels following an active period of DRX, which may correspond to an on duration (e.g., prior to reentering a sleep or low power mode after the active period). The active period may correspond to an on duration of the DRX configuration (e.g., just the on duration if no downlink message or data is received, or the on duration and any additional active time if a downlink message or data is received). The one or more other channels may be one or more channels between the UE 115-*a* and one or more other base stations 105 (e.g., other radio access technologies (RATs), other cells, other network nodes, one or more channels at one or more other frequencies, or any combination thereof). Further, the UE 115-*a* may measure a respective channel metric (e.g., signal-to-noise ratio (SNR), channel quality indictor (CQI), or the like) of the one or more other channels to determine to the communication performance of the one or more other channels. In some cases, the communication performance of a second channel may be higher than the communication performance of the first channel, and the communications between the UE 115-*a* and the base station 105-*a* may be transferred to the second channel. For example, the second channel may be a channel between the UE 115-*a* and a second base station 105. As such, the base station 105-*a* may perform a handover procedure (e.g., inter-RAT handover, inter-cell handover, or another handover procedure) to the second base station 105 based on the measuring.

In some cases, such as high mobility applications (e.g., if the UE 115-*a* is traveling via a high speed train), the UE 115-*a* may experience frequent changes in communication performance due to frequent signal changes corresponding to the relatively high speed of the UE 115-*a*. Accordingly, the UE 115-*a* may fail to measure the one or more other channels at a periodicity that can account for the rapid changes, potentially resulting in decreased communication performance. That is, the period of time between starts of consecutive on durations (e.g., the long cycle duration) of the UE 115-*a* may be associated with a measurement periodicity less than the frequency at which the signal changes. In such cases, the UE 115-*a* may detect that a speed of the UE 115-*a* satisfies a mobility threshold, which may trigger the UE 115-*a* to transmit control signaling 220 requesting one or more parameters to update the DRX configuration 215-*a*, described further with respect to FIG. 3. For example, the UE 115-*a* may detect a speed greater than the mobility threshold and may transmit the control signaling 220 (e.g., RRC signaling or other uplink control signaling) requesting a decrease in the period of time between starts of consecutive on durations in order to increase the periodicity at which the UE 115-*a* measures the one or more other channels. The base station 105-*a* may receive the control signaling 220 and transmit an updated DRX configuration 215-*b* based on the control signaling 220. That is, the base station 105-*a* may transmit the DRX configuration 215-*b* (e.g., RRC signaling) configuring the UE 115-*a* with the requested update to the DRX configuration.

In some examples, the UE 115-*a* may detect that a speed of the UE 115-*a* fails to satisfy a mobility threshold, which may trigger the UE 115-*a* to transmit control signaling 220 requesting one or more parameters to update the DRX configuration 215-*a*. For example, the UE 115-*a* may detect a speed less than a mobility threshold (e.g., indicating that the UE 115-*a* is stationary or is no longer at high mobility) and may transmit control signaling 220 requesting an increase in the period of time between starts of consecutive on durations to decrease the periodicity at which the UE 115-*a* measures the one or more other channels and, correspondingly, reduce the power consumption. Alternatively, the UE 115-*a* may transmit control signaling 220 lacking a request (e.g., an empty value corresponding to the preferredDRX-LongCycle). Although described with respect to one mobility threshold, it is understood that multiple mobility thresholds may be applicable. For example, the UE 115-*a* may use a first mobility threshold to switch to a "high mobility mode" (e.g., and request a relatively shorter DRX cycle) and may use a second mobility threshold to switch out of the "high mobility mode" (e.g., a request a relatively longer DRX cycle). Additionally or alternatively, the UE 115-*a* may have multiple mobility threshold corresponding to multiple mobility modes and associated DRX cycle lengths (e.g., a stationary mode with a first cycle length, a low mobility mode with a second cycle length, a medium mobility mode with a third cycle length, a high mobility mode with a fourth cycle length).

As an illustrative example, the base station 105-*a* may transmit the DRX configuration 215-*a* configuring the UE 115-*a* with a long cycle duration of 160 ms. The UE 115-*a* may detect a speed of the UE 115-*a* greater than the mobility threshold (e.g., 80 miles per hour (mph)). The UE 115-*a* may transmit the control signaling 220 to the base station 105-*a* requesting a long cycle duration of 80 ms based on the speed exceeding the threshold. The base station 105-*a* may transmit the DRX configuration 215-*b* configuring the UE 115-*a* with the long cycle duration of 80 ms. In some other examples, the UE 115-*a*, operating with the long cycle duration of 80 ms, may detect a speed less than the mobility threshold (e.g., 80 mph) or a second mobility threshold (e.g., 45 mph, where using a different mobility threshold may prevent a "ping-pong" issue in transmitting control signaling 220 frequently) and may transmit control signaling 220 to the base station 105-*a* requesting the long cycle duration of 160 ms. As such, the base station 105-*a* may transmit the DRX configuration 215-*b* configuring the UE 115-*a* with the long cycle duration of 160 ms. Alternatively, the UE 115-*a* may transmit the control signaling 220 with an empty value or null value for the preferred (or requested) long cycle duration, and the base station 105-*a* may transmit the DRX configuration 215-*b* configuring the UE 115-*a* with a default or fallback value for the long cycle duration (e.g., 160 ms).

In some cases, the base station 105-*a* may configure the UE 115-*a* with a WUS configuration (e.g., via setup{DCP-Config}). That is, the base station 105-*a* may transmit the DRX configuration 215-*a* (or another configuration) to the UE 115-*a* configuring the UE 115-*a* to receive WUSs indication an upcoming transmission, or lack of upcoming transmission, in a next DRX on duration. For example, the UE 115-*a* may monitor for a WUS prior to an on duration and may determine whether to wake up for the on duration based on whether the UE 115-*a* receives the WUS. In some cases, the base station 105-*a* may transmit a WUS indicating an upcoming transmission. As such, the UE 115-*a* may receive the WUS and wake up (e.g., enter an on duration) and receive the transmission. Alternatively, if the base station 105-*a* does not have pending data ready to transmit to the UE 115-*a* in an on duration, the base station 105-*a* may refrain from transmitting a WUS prior to the on duration. As such, the UE 115-*a* may identify the lack of a WUS and may refrain from waking up in the corresponding on duration.

In some cases, the UE 115-*a* may include a wake up receiver and a main receiver. The wake up receiver may receive WUSs while the main receiver remains in an idle mode. In some such cases, the base station 105-*a* may transmit a WUS to the UE 115-*a*, and the UE 115-*a* may receive and decode the WUS without entering an on duration (e.g., without entering a power mode to operate the main receiver). If the wake up receiver at the UE 115-*a* receives and decodes the WUS, the UE 115-*a* may wake up and operate (e.g., power on) the main receiver to receive downlink signaling corresponding to the WUS. If the base station 105-*a* refrains from transmitting a WUS, the wake up receiver at the UE 115-*a* may identify the lack of a WUS while the main receiver remains in an idle mode, and the UE 115-*a* may refrain from waking up. Alternatively, the UE 115-*a* may use a same receiver (e.g., a main receiver, which may be an aspect of a transceiver) for receiving WUSs and downlink signaling. However, the UE 115-*a* may operate in a relatively lower power mode, for a relatively shorter time, or both when monitoring for WUSs as compared to when monitoring for downlink signaling during an on duration.

Figure 5:
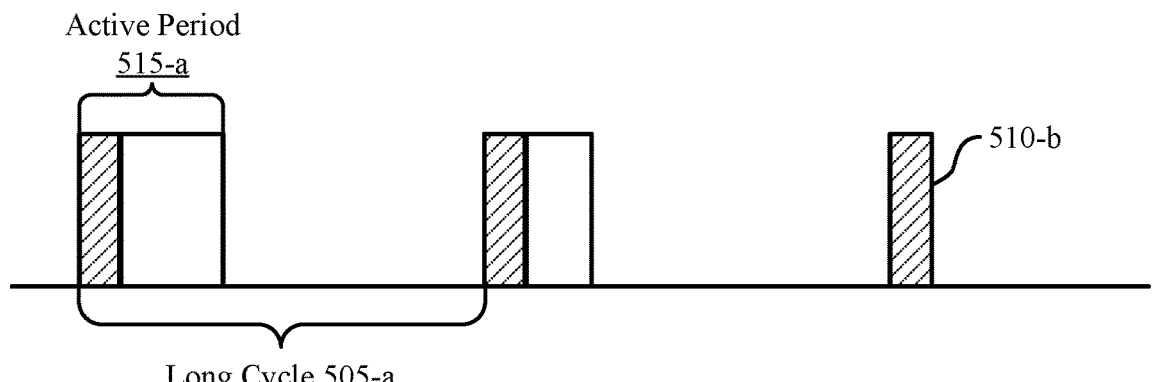
FIG. 5 illustrates an example of a DRX configuration that supports triggering UAI based on mobility and WUS configuration in accordance with aspects of the present disclosure.
Figure 5:
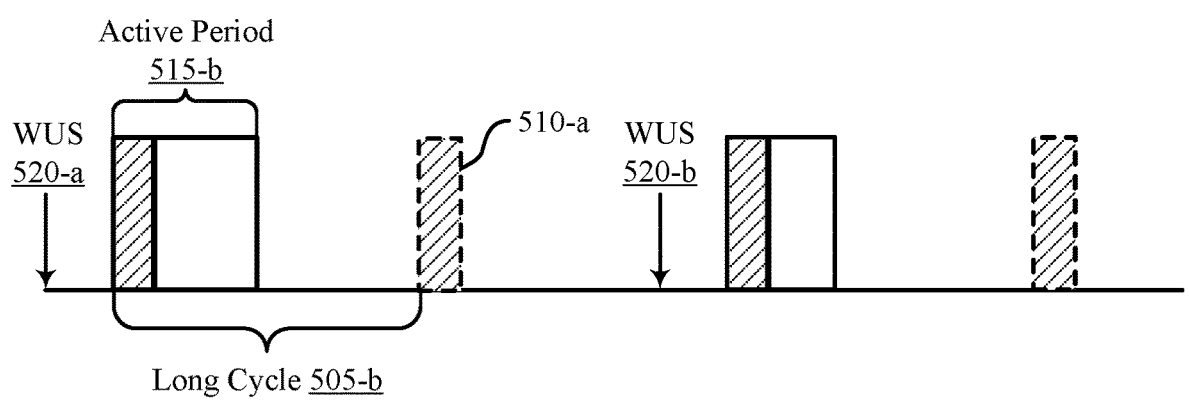
Figure 5:

In some cases, the base station 105-*a* may configure the UE 115-*a* to monitor for WUSs, which may trigger the UE 115-*a* to transmit control signaling 220 requesting one or more parameters to update the DRX configuration, described further with respect to FIG. 5. For example, the base station 105-*a* may transmit the DRX configuration 215-*a* or other configuration signaling configuring the UE 115-*a* to receive WUSs. The UE 115-*a* may identify that WUSs are configured and may transmit control signaling 220 requesting a decrease in the period of time between starts of consecutive on durations (e.g., due to power savings from the WUSs, the UE may support more frequent on durations for the same or similar battery power savings). Transmitting the control signaling 220 requesting one or more parameters to update the DRX configuration 215-*a* based on WUS configuration may result in increased communication reliability due to the increased frequency of the on duration while maintaining a power overhead threshold due to the power savings from the WUSs.

As an illustrative example, the base station 105-*a* may transmit the DRX configuration 215-*a* (or other configuration signaling) configuring the UE 115-*a* to receive WUSs. The DRX configuration 215-*a* may also configure the UE 115-*a* with a long cycle of 160 ms. The UE 115-*a* may identify that WUSs are configured and may transmit control signaling 220 requesting a long cycle duration of 80 ms based on the WUS configuration. The base station 105-*a* may transmit the DRX configuration 215-*b* configuring the UE 115-*a* with the long cycle duration of 80 ms based on the control signaling 220. In some examples, if the base station 105-*a* removes the WUS configuration (e.g., deactivates WUSs) for the UE 115-*a*, the UE 115-*a* may transmit control signaling 220 requesting a relatively longer cycle duration (e.g., 160 ms, 320 ms) to improve power savings without using WUSs.

Figure 3:
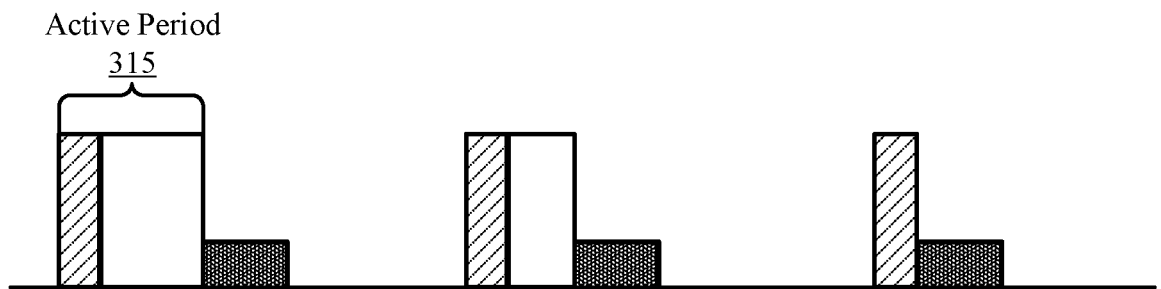
FIG. 3 illustrates an example of a discontinuous reception (DRX) configuration that supports triggering UAI based on mobility and WUS configuration in accordance with aspects of the present disclosure.
Figure 3:
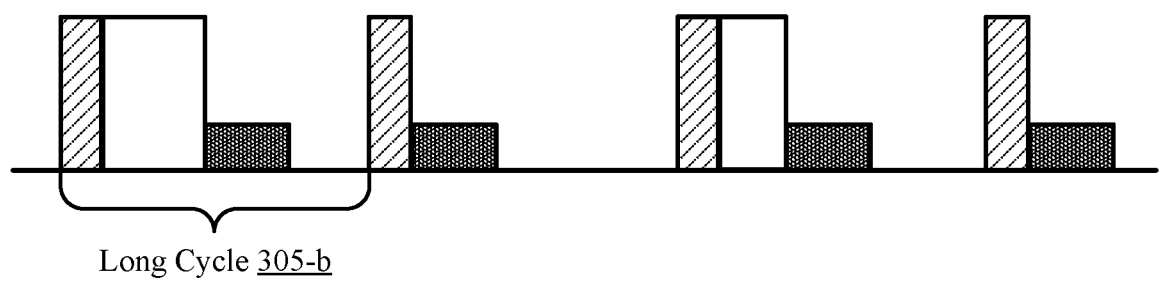

FIG. 3 illustrates an example of a DRX configuration 300 that supports triggering UAI based on mobility and WUS configuration in accordance with aspects of the present disclosure. In some examples, the DRX configuration 300 may implement or be implemented by aspects of a wireless communications system 100, a wireless communications system 200, or both. For example, a UE 115 may transmit, to a base station 105 (e.g., a network node), control signaling requesting one or more parameters to update the DRX configuration 300 based on the UE 115 mobility.

In some cases, a UE 115 may transmit control signaling requesting one or more parameters to update the DRX configuration based on mobility of the UE 115. For example, the UE 115 may operate according to a DRX cycle with a long cycle 305-*a*. The long cycle 305-*a* may include an on duration 310 followed by an off duration. The UE 115 may wake up during the on duration 310 and monitor for a transmission from a base station 105 via a first channel. In some cases, the base station 105 may transmit signaling during the on duration 310. As such, the UE 115 may receive the transmission during an active period 315 based on the monitoring. Further, the UE 115 may perform a measurement 320 of one or more other channels after the active period 315. The UE 115 may perform the measurement 320 to determine the communication performance for one or more other channels. In some cases, the communication performance of a second channel associated with the one or more other channels may be greater than the communication performance of the first channel (e.g., a higher SNR, a higher reference signal received quality (RSRQ), a higher reference signal received power (RSRP)). As such, the base station 105 may perform a handover (e.g., inter-RAT handover) of the UE 115 to the second channel.

In some cases, such as high mobility applications (e.g., in a high speed train scenario), the UE 115 may experience frequent changes in communication performance due to frequent signal changes corresponding to the relatively high speed of the UE 115-a. Accordingly, the UE 115-a may fail to perform the measurements 320 at a periodicity that can account for the rapid changes, potentially resulting in decreased communication performance. That is, the long cycle 305-a may be associated with a periodicity of the measurements 320 less than the frequency at which the signal significantly changes (e.g., by a signal change threshold). As such, the time between the signal changes may be less than the time between a first measurement 320 and a second measurement 320. In such cases, the UE 115 may detect that the speed of the UE 115 satisfies (e.g., exceeds) a mobility threshold, which may trigger the UE 115 to transmit control signaling requesting one or more parameters to update the DRX configuration 300. For example, the UE 115 may detect a speed greater than the mobility threshold and may transmit control signaling requesting a decrease in duration of the long cycle 305-a (e.g., a shorter long cycle 305-a length). As such, the base station 105 may transmit a configuration indicating a long cycle 305-b, where the long cycle 305-b is shorter than the long cycle 305-a, resulting in an increase in the periodicity of the measurements 320.

In some cases, the UE 115 may detect the speed of the UE 115 based on a doppler frequency shift, such that the doppler frequency shift is greater or less than one or more thresholds (TH_freqshift). For example, a doppler frequency shift greater than a threshold may trigger a request for a decrease in the length of the long cycle 305-a and a doppler frequency shift less than the threshold (or an additional threshold) may trigger a request for an increase in the length of the long cycle 305-a. Additionally or alternatively, the UE 115 may detect the speed of the UE 115 based on a quantity of cell changes in a time period, such that the quantity of cell changes in a time period is greater or less than one or more thresholds (TH_cellchange). For example, a quantity of cell changes in a time period greater than a threshold quantity may trigger a request for a decrease in the length of the long cycle 305-a and a quantity of cell changes in a time period less than the threshold quantity (or an additional threshold quantity) may trigger a request for an increase in the length of the long cycle 305-a.

Figure 4:
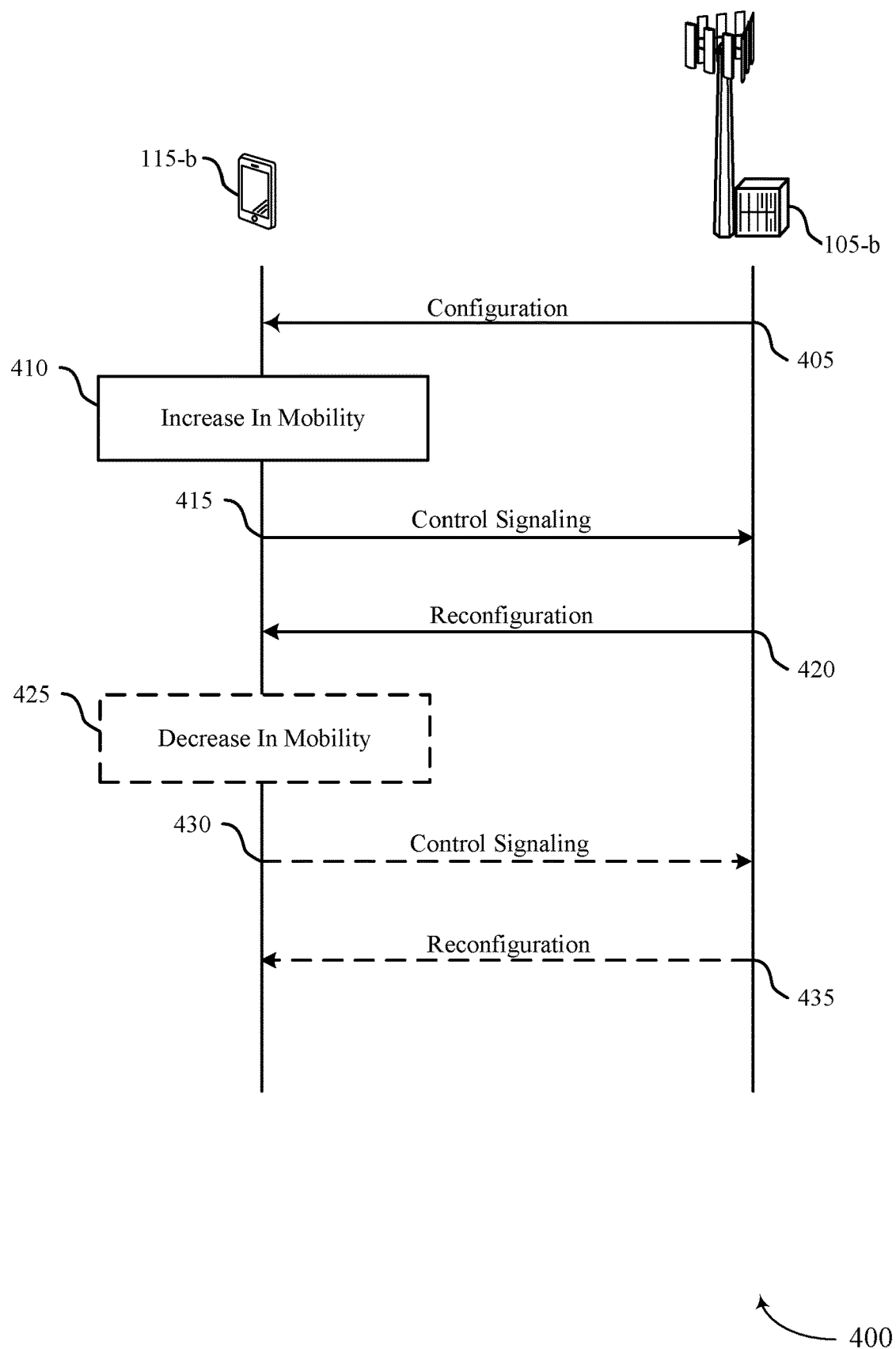
FIG. 4 illustrates an example of a process flow that supports triggering UAI based on mobility and WUS configuration in accordance with aspects of the present disclosure.

FIG. 4 illustrates an example of a process flow 400 that supports triggering UAI based on mobility and WUS configuration in accordance with aspects of the present disclosure. In some examples, the process flow 400 may implement or be implemented by aspects of a wireless communications system 100, a wireless communications system 200, a DRX configuration 300, or some combination thereof. The process flow 400 may include a UE 115-b and a base station 105-b (e.g., a network node, a system of multiple network nodes), which may be examples of a UE 115 and a base station 105 and may communicate with one another as described herein with reference to FIG. 1. For example, the UE 115-b may communicate with the base station 105-b on a first channel according to a DRX configuration. In the following description of the process flow 400, the operations between the UE 115-b and the base station 105-b may be transmitted in a different order than the example order shown, or the operations performed by the UE 115-b and the base station 105-b may be performed in different orders or at different times. Additionally or alternatively, some operations may be omitted from the process flow 400, and other operations may be added to the process flow 400.

At 405, the base station 105-b may transmit, to the UE 115-b, a DRX configuration including a set of parameters associated with a DRX cycle. In some cases, the DRX configuration may include a periodicity of on durations (e.g., a long cycle). For example, the DRX configuration may include a first time duration between the starts of consecutive on durations. In some cases, the UE 115-b may measure a respective channel metric for one or more other channels based on the periodicity of on durations. Further, the UE 115-b may measure the respective channel metric for one or more other frequencies, one or more other cells, one or more other RATs, or a combination thereof.

At 410, the UE 115-b may increase in mobility (e.g., speed) and the UE 115-b may determine that a speed of the UE 115-b satisfies a mobility threshold. For example, the speed of the UE 115-b may be greater than the mobility threshold. In some cases, the UE 115-b may determine the speed satisfies the mobility threshold based on determining that a doppler frequency shift for the UE 115-b satisfies a threshold frequency shift. In some other cases, the UE 115-b may determine the speed satisfies the mobility threshold based on determining that a rate of cell changes for the UE 115-b satisfies a threshold cell change rate.

At 415, the UE 115-b may transmit control signaling (e.g., UAI) requesting one or more parameters to update the DRX configuration based on the speed of the UE 115-b satisfying the mobility threshold. In some cases, the one or more parameters may include a preferred value for a DRX long cycle of the DRX configuration. The DRX long cycle may indicate a time duration between starts of consecutive on durations of the DRX configuration if the UE 115-b has failed to receive data for a threshold quantity of preceding on durations (e.g., corresponding to a DRX short cycle timer). For example, the one or more parameters may indicate a second time duration for the DRX long cycle.

At 420, the base station 105-b may transmit, to the UE 115-b, a DRX reconfiguration including the one or more requested parameters. For example, the base station 105-b may reconfigure the UE 115-b with the second time duration. In some cases, the second time duration may be less than the first time duration. As such, the UE 115-b may increase the rate of measuring the respective channel metric for the one or more other channels based on the second time duration. In some cases, the UE 115-b may perform a handover procedure to a second base station 105 based on the measuring.

In some examples, at 425, the UE 115-b may decrease in mobility and the UE 115-b may determine that a speed of the UE 115-*b* satisfies (or fails to satisfy) a mobility threshold. For example, the speed of the UE 115-*b* may be less than the mobility threshold.

At 430, the UE 115-*b* may transmit control signaling (e.g., UAI) requesting one or more parameters to update the DRX configuration based on the speed of the UE 115-*b* satisfying the mobility threshold. For example, the one or more parameters may indicate a third time duration for the DRX long cycle. In some cases, the UE 115-*b* may refrain from indicating a time duration (e.g., an empty value) based on the speed of the UE 115-*b* being less than the mobility threshold.

At 435, the base station 105-*b* may transmit, to the UE 115-*b*, a DRX reconfiguration including the one or more requested parameters. For example, the base station 105-*b* may reconfigure the UE 115-*b* with the third time duration (or a default time duration in response to an empty value). In some cases, the third time duration may be greater than the first time duration, second time duration, or both. As such, the UE 115-*b* may decrease the rate of measuring the respective channel metric for the one or more other channels based on the third time duration.

In some cases, the UE 115-*b* may perform a handover procedure to a second base station 105 based on the measuring.

FIG. 5 illustrates an example of a DRX configuration 500 that supports triggering UAI based on mobility and WUS configuration in accordance with aspects of the present disclosure. In some examples, the DRX configuration 500 may implement or be implemented by aspects of a wireless communications system 100, a wireless communications system 200, a DRX configuration 300, a process flow 400, or any combination thereof. For example, a UE 115 may transmit, to a base station 105, control signaling requesting one or more parameters to update the DRX configuration based on a WUS configuration. For example, the UE 115 may operate according to a DRX cycle with a long cycle 505-*a*. The long cycle 505-*a* may include an on duration 510 followed by an off duration. In some cases, the UE 115 may wake up during the on duration 510 and may monitor for a transmission from a base station 105. In some cases, the base station 105 may transmit signaling during the on duration 510. As such, the UE 115 may receive the transmission during an active period 515-*a* based on the monitoring.

In some cases, the base station 105 may configure the UE 115 to monitor for WUSs 520, such as a WUS 520-*a* and a WUS 520-*b*. The WUSs 520 may be used to indicate an upcoming transmission. For example, the base station 105 may transmit the WUS 520-*a* indicating an upcoming transmission in the subsequent on duration 510. The UE 115 may receive the WUS 520-*a* and wake up during the on duration 510. The UE 115 may receive the transmission in the active period 515-*b* based on receiving the WUS 520-*a*. Alternatively, the base station 105 may refrain from transmitting a WUS 520. As such, the UE 115 may identify the lack of the WUS 520 and refrain from waking up during the on duration 510 (e.g., the UE 115 may fail to detect a WUS 520 prior to the on duration 510-*a* and, in response, may refrain from waking up during the on duration 510-*a*). In contrast, if WUSs 520 are not configured, the UE 115 may wake up and monitor for downlink signaling in on durations (e.g., each on duration of the DRX configuration) even if there is no downlink signaling scheduled by the base station 105 for the on duration, such as for the on duration 510-*b*. Accordingly, the WUS configuration may reduce the quantity of times the UE 115 ramps up power and turns on processing resources to monitor on durations 510 in a DRX configuration 500.

In some cases, the UE 115 may identify that WUSs 520 are configured and may transmit control signaling requesting one or more parameters to update the DRX configuration. For example, the UE 115 may operate according to a long cycle 505-*a* and may receive a configuration from the base station 105 configuring UE 115 to monitor for the WUSs 520. The UE 115 may transmit, to the base station 105, control signaling requesting a decrease in duration of the long cycle 505-*a* (e.g., a shorter long cycle 505-*a* length). In response, the base station 105 may transmit, to the UE 115, a configuration indicating a long cycle 505-*b*, where the long cycle 505-*b* is shorter than the long cycle 505-*a*. Transmitting control signaling requesting one or more parameters (e.g., relatively more optimal parameters) to update the DRX configuration based on WUS configuration may result in increased communication reliability due to the increased frequency of the on durations 510. Additionally, the UE 115 may maintain a power overhead threshold due to the power savings from the WUSs 520 (e.g., from skipping waking up for a subset of on durations 510, such as for the on duration 510-*a*).

In some cases, the UE 115 may transmit control signaling requesting one or more parameters to update the DRX configuration based on the WUS configuration as well as a quality of service (QoS) delay threshold. The QoS delay threshold may indicate a threshold latency for communications (e.g., specific communications, such as relatively high priority communications). For example, a long cycle duration may be less than the QoS delay threshold, such that the UE 115 does not enter an off duration lasting longer than the QoS delay threshold (e.g., potentially causing the UE 115 to fail to receive downlink signaling within the QoS delay threshold). In some cases, if the UE 115 is configured to monitor for WUSs 520, the UE 115 may consider the QoS delay threshold in a relatively higher percentile than if the UE 115 was not configured to monitor for WUSs 520 (e.g., 99% versus 95%). That is, the WUS configuration may trigger the UE 115 to increase the periodicity of the on durations 510, allowing the UE 115 to correspondingly increase the consistency of meeting the QoS delay threshold, D.

Figure 6:
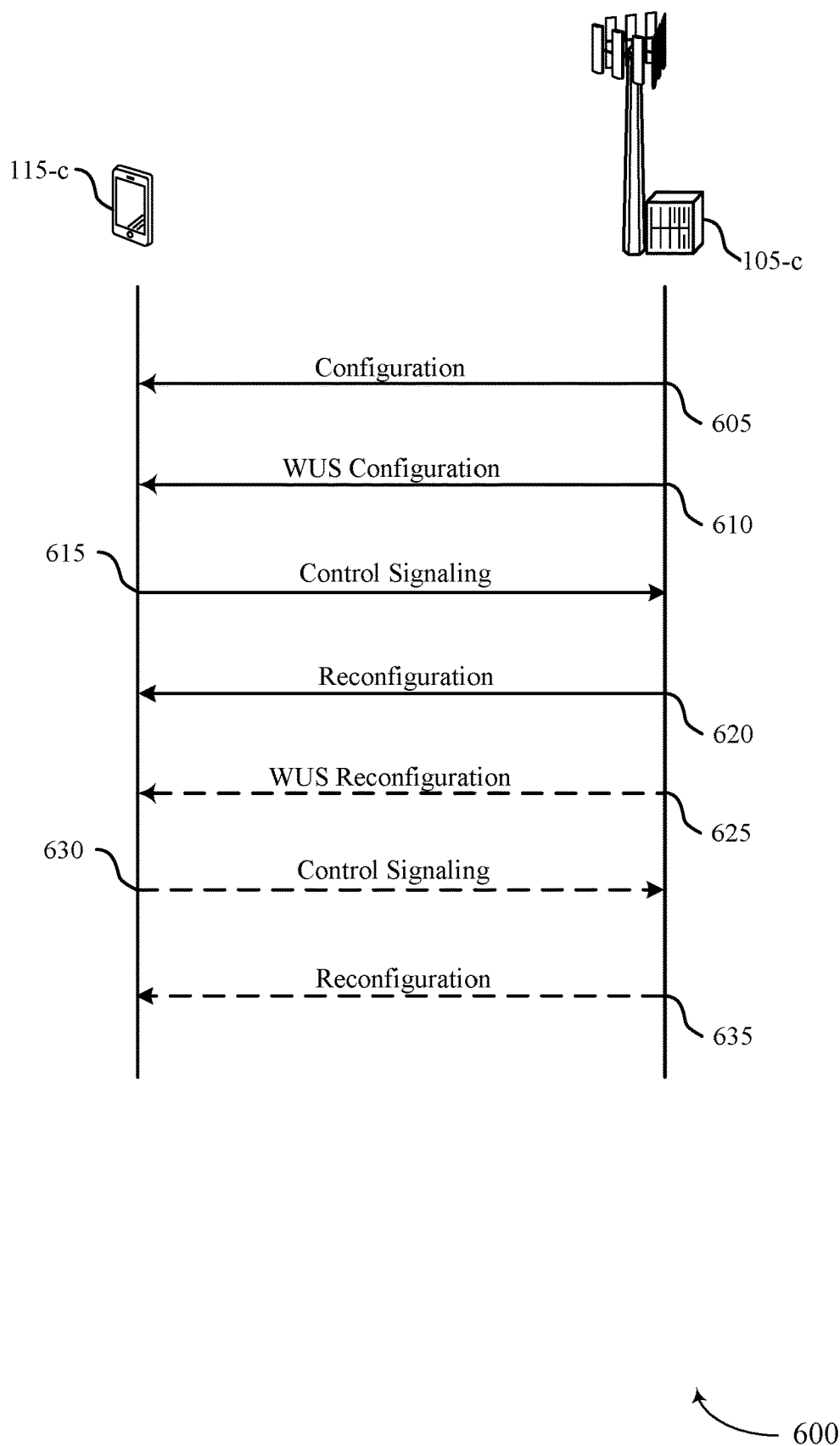
FIG. 6 illustrates an example of a process flow that supports triggering UAI based on mobility and WUS configuration in accordance with aspects of the present disclosure.

FIG. 6 illustrates an example of a process flow 600 that supports triggering UAI based on mobility and WUS configuration in accordance with aspects of the present disclosure. In some examples, the process flow 600 may implement or be implemented by aspects of a wireless communications system 100, a wireless communications system 200, a DRX configuration 300, a process flow 400, a DRX configuration 500, or some combination thereof. The process flow 600 may include a UE 115-*c* and a base station 105-*c* (e.g., a network node, a system of multiple network nodes), which may be examples of a UE 115 and a base station 105 and may communicate with one another as described herein with reference to FIG. 1. For example, the UE 115-*c* may communicate with the base station 105-*c* according to a DRX configuration. In the following description of the process flow 600, the operations between the UE 115-*c* and the base station 105-*c* may be transmitted in a different order than the example order shown, or the operations performed by the UE 115-*c* and the base station 105-*c* may be performed in different orders or at different times. Additionally or alternatively, some operations may be omitted from the process flow 600, and other operations may be added to the process flow 600.

At 605, the base station 105-*c* may transmit, to the UE 115-*c*, first control signaling indicating a DRX configuration including a set of parameters associated with the DRX cycle.

In some cases, the DRX configuration may include a periodicity of on durations (e.g., a long cycle). For example, the DRX configuration may include a first time duration between the starts of consecutive on durations.

At 610, the base station 105-c may transmit, to the UE 115-c, second control signaling configuring the UE 115-c to monitor for WUSs for the DRX configuration. The first control signaling and the second control signaling may be separate control messages or may be the same control message. In some cases, the UE 115-c may monitor for a WUS prior to an on duration of the DRX configuration. The UE 115-c may receive the WUS based on the monitoring and perform a wake up procedure for the on duration of the DRX configuration based on the received WUS.

At 615, the UE 115-c may transmit third control signaling (e.g., UAI) requesting one or more parameters to update the DRX configuration based on the second control signaling configuring the UE 115-c to monitor for WUSs. In some cases, the one or more parameters may include a preferred value for a DRX long cycle of the DRX configuration. The DRX long cycle may indicate a time duration between starts of consecutive on durations of the DRX configuration if the UE 115-c has failed to receive data for a threshold quantity of preceding on durations. For example, the one or more parameters may indicate a second time duration for the DRX long cycle, where the second time duration is shorter than the first time duration based on the UE 115-c being configured to monitor for the WUSs.

In some cases, the UE 115-c may determine a value for a DRX long cycle of the DRX configuration based on a QoS delay threshold and may request the second time duration based on the value. Further, the UE 115-c may determine the QoS delay threshold based on the UE 115-c being configured to monitor for WUSs.

At 620, the base station 105-c may transmit, to the UE 115-c, a DRX reconfiguration including the one or more requested parameters. For example, the base station 105-c may reconfigure the UE 115-c with the second time duration.

In some examples, at 625, the base station 105-c may transmit, to the UE 115-c, fourth control signaling configuring the UE 115-c to refrain from monitor for WUSs for the DRX configuration.

At 630, the UE 115-c may transmit fifth control signaling (e.g., UAI) requesting one or more parameters to update the DRX configuration based on the fourth control signaling configuring the UE 115-c to refrain from monitoring for WUSs. For example, the one or more parameters may indicate a third time duration or an empty value for the DRX long cycle, where the third time duration is greater than the first time duration, the second time duration, or both based on the UE 115-c being configured to refrain from monitoring for the WUSs.

At 635, the base station 105-c may transmit, to the UE 115-c, a DRX reconfiguration including the one or more requested parameters. For example, the base station 105-c may reconfigure the UE 115-c with the third time duration or a default time duration (e.g., if an empty or null value is indicated for the preferred DRX long cycle field in the UAI).

Figure 7:
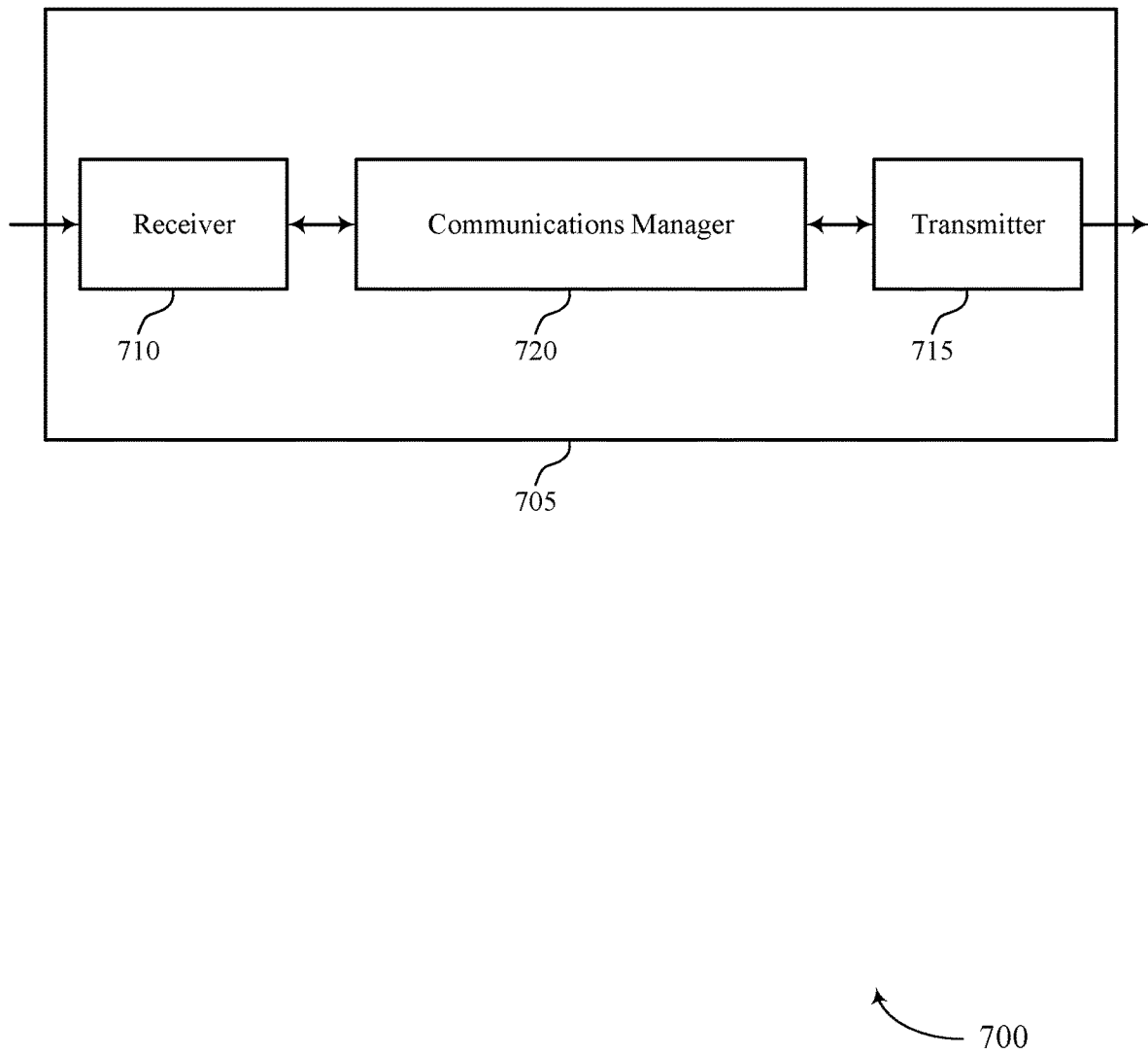
FIGS. 7 and 8 show block diagrams of devices that support triggering UAI based on mobility and WUS configuration in accordance with aspects of the present disclosure.

FIG. 7 shows a block diagram 700 of a device 705 that supports triggering UAI based on mobility and WUS configuration in accordance with aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to triggering UAI based on mobility and WUS configuration). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to triggering UAI based on mobility and WUS configuration). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of triggering UAI based on mobility and WUS configuration as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a UE in accordance with examples as disclosed herein. For example, the communications manager 720 may be configured as or otherwise support a means for communicating with a network node on a first channel according to a discontinuous reception configuration. The communications manager 720 may be configured as or otherwise support a means for determining that a speed of the UE satisfies a mobility threshold. The communications manager 720 may be configured as or otherwise support a means for transmitting, to the network node, UAI requesting one or more parameters to update the discontinuous reception configuration in response to determining that the speed satisfies the mobility threshold. The communications manager 720 may be configured as or otherwise support a means for receiving, from the network node and in response to the UAI, signaling configuring the discontinuous reception configuration with the requested one or more parameters.

Additionally or alternatively, the communications manager 720 may support wireless communications at a UE in accordance with examples as disclosed herein. For example, the communications manager 720 may be configured as or otherwise support a means for receiving, from a network node, first signaling configuring the UE to monitor for wake up signals for a discontinuous reception configuration. The communications manager 720 may be configured as or otherwise support a means for transmitting, to the network node, UAI requesting one or more parameters to update the discontinuous reception configuration in response to the first signaling configuring the UE to monitor for the wake up signals. The communications manager 720 may be configured as or otherwise support a means for receiving, from the network node and in response to the UAI, second signaling configuring the discontinuous reception configuration with the requested one or more parameters.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for triggering UAI based on mobility and WUS configuration, which may result in increased communication performance, reduced power consumption, and increased communication reliability, among other advantages.

Figure 8:
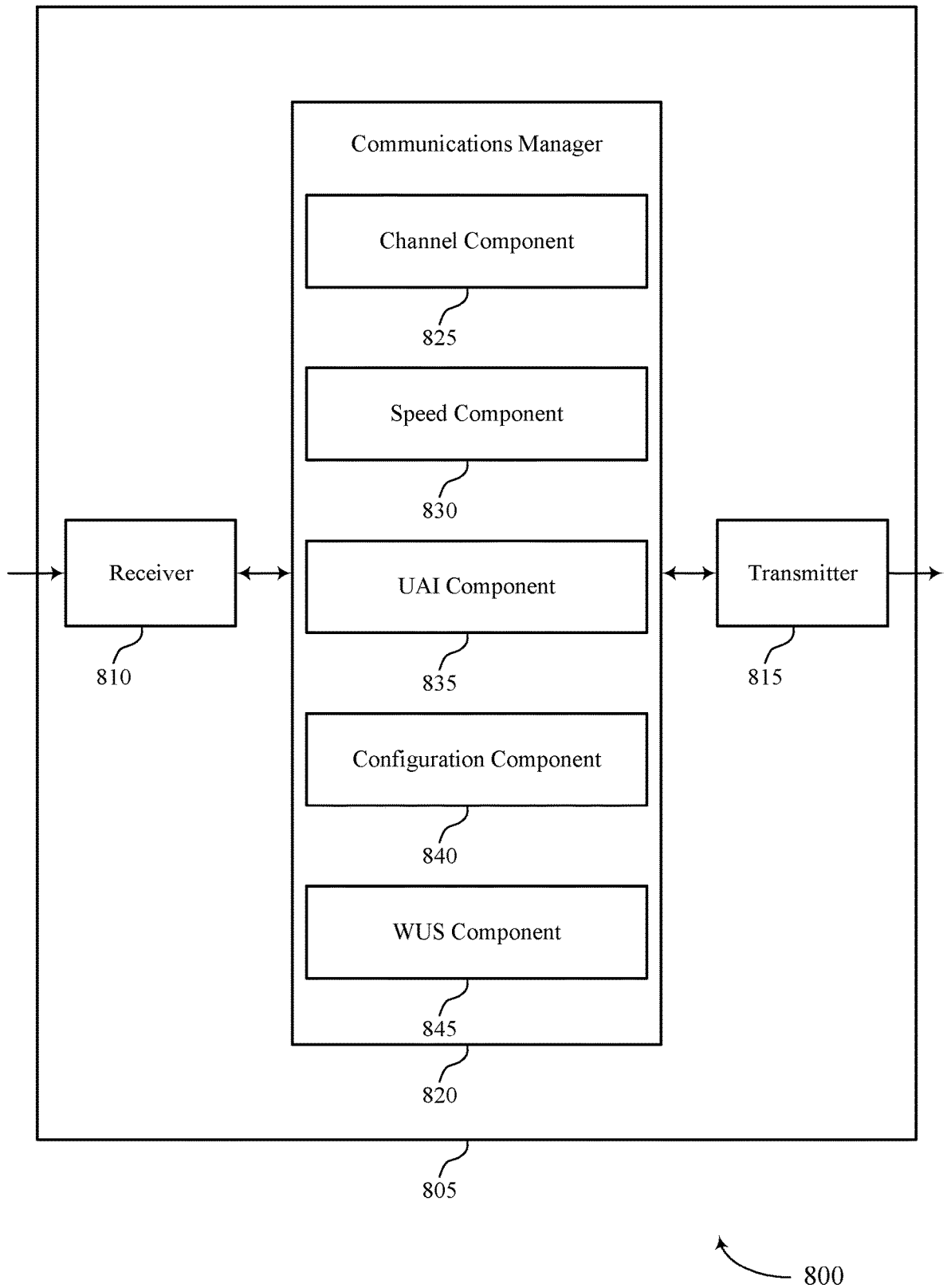

FIG. 8 shows a block diagram 800 of a device 805 that supports triggering UAI based on mobility and WUS configuration in accordance with aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to triggering UAI based on mobility and WUS configuration). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to triggering UAI based on mobility and WUS configuration). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of triggering UAI based on mobility and WUS configuration as described herein. For example, the communications manager 820 may include a channel component 825, a speed component 830, a UAI component 835, a configuration component 840, a WUS component 845, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at a UE in accordance with examples as disclosed herein. The channel component 825 may be configured as or otherwise support a means for communicating with a network node on a first channel according to a discontinuous reception configuration. The speed component 830 may be configured as or otherwise support a means for determining that a speed of the UE satisfies a mobility threshold. The UAI component 835 may be configured as or otherwise support a means for transmitting, to the network node, UAI requesting one or more parameters to update the discontinuous reception configuration in response to determining that the speed satisfies the mobility threshold. The configuration component 840 may be configured as or otherwise support a means for receiving, from the network node and in response to the UAI, signaling configuring the discontinuous reception configuration with the requested one or more parameters.

Additionally or alternatively, the communications manager 820 may support wireless communications at a UE in accordance with examples as disclosed herein. The WUS component 845 may be configured as or otherwise support a means for receiving, from a network node, first signaling configuring the UE to monitor for wake up signals for a discontinuous reception configuration. The UAI component 835 may be configured as or otherwise support a means for transmitting, to the network node, UAI requesting one or more parameters to update the discontinuous reception configuration in response to the first signaling configuring the UE to monitor for the wake up signals. The configuration component 840 may be configured as or otherwise support a means for receiving, from the network node and in response to the UAI, second signaling configuring the discontinuous reception configuration with the requested one or more parameters.

Figure 9:
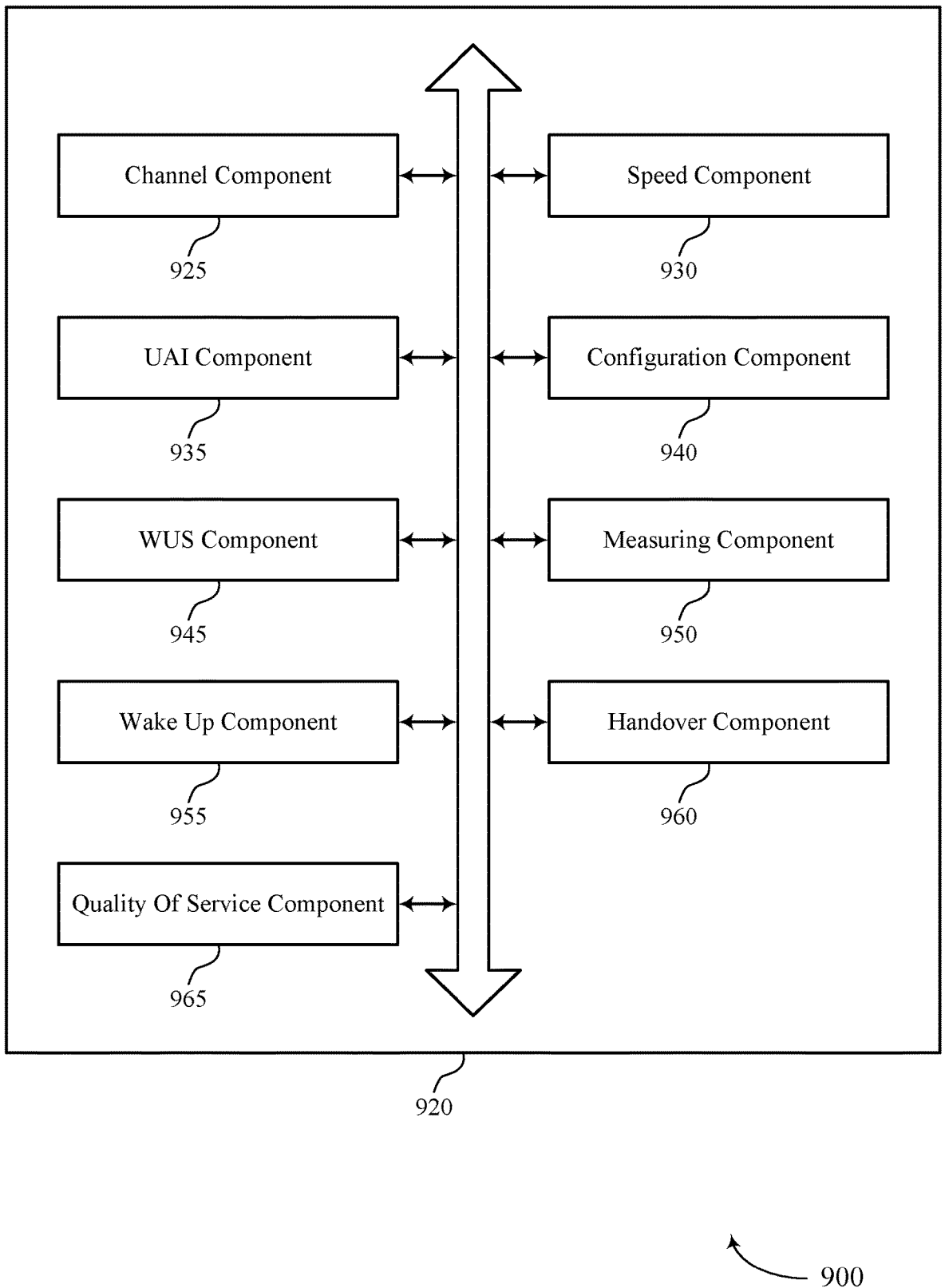
FIG. 9 shows a block diagram of a communications manager that supports triggering UAI based on mobility and WUS configuration in accordance with aspects of the present disclosure.

FIG. 9 shows a block diagram 900 of a communications manager 920 that supports triggering UAI based on mobility and WUS configuration in accordance with aspects of the present disclosure. The communications manager 920 may be an example of aspects of a communications manager 720, a communications manager 820, or both, as described herein. The communications manager 920, or various components thereof, may be an example of means for performing various aspects of triggering UAI based on mobility and WUS configuration as described herein. For example, the communications manager 920 may include a channel component 925, a speed component 930, a UAI component 935, a configuration component 940, a WUS component 945, a measuring component 950, a wake up component 955, a handover component 960, a quality of service component 965, or any combination thereof. Each of these components may communicate, directly or indirectly, with one another (e.g., via one or more buses).

The communications manager 920 may support wireless communications at a UE in accordance with examples as disclosed herein. The channel component 925 may be configured as or otherwise support a means for communicating with a network node on a first channel according to a discontinuous reception configuration. The speed component 930 may be configured as or otherwise support a means for determining that a speed of the UE satisfies a mobility threshold. The UAI component 935 may be configured as or otherwise support a means for transmitting, to the network node, UAI requesting one or more parameters to update the discontinuous reception configuration in response to determining that the speed satisfies the mobility threshold. The configuration component 940 may be configured as or otherwise support a means for receiving, from the network node and in response to the UAI, signaling configuring the discontinuous reception configuration with the requested one or more parameters.

In some examples, the discontinuous reception configuration includes a periodicity of on durations, and the measuring component 950 may be configured as or otherwise support a means for measuring a respective channel metric for one or more other channels based on the periodicity of the on durations for the discontinuous reception configuration.

In some examples, the discontinuous reception configuration includes a first time duration between starts of consecutive on durations and the one or more parameters indicates a second time duration between the starts of the consecutive on durations that is less than the first time duration. The measuring component 950 may be configured as or otherwise support a means for increasing a rate of performing the measuring based on the second time duration being less than the first time duration.

In some examples, the discontinuous reception configuration includes a first time duration between starts of consecutive on durations and the one or more parameters indicates a second time duration between the starts of the consecutive on durations that is greater than the first time duration or refrains from indicating a time duration between the starts of the consecutive on durations. The measuring component 950 may be configured as or otherwise support a means for decreasing a rate of performing the measuring based on the second time duration being greater than the first time duration or the one or more parameters refraining from indicating the time duration between the starts of the consecutive on durations.

In some examples, to support measuring, the measuring component 950 may be configured as or otherwise support a means for measuring the respective channel metric for one or more other frequencies, one or more other cells, one or more other radio access technologies, or a combination thereof.

In some examples, the handover component 960 may be configured as or otherwise support a means for performing a handover procedure to a second network node based on the measuring.

In some examples, to support determining that the speed of the UE satisfies the mobility threshold, the speed component 930 may be configured as or otherwise support a means for determining that a doppler frequency shift for the UE satisfies a threshold frequency shift.

In some examples, to support determining that the speed of the UE satisfies the mobility threshold, the speed component 930 may be configured as or otherwise support a means for determining that a rate of cell changes for the UE satisfies a threshold cell change rate.

In some examples, the one or more parameters includes a preferred value for a discontinuous reception long cycle of the discontinuous reception configuration, the discontinuous reception long cycle indicating a time duration between starts of consecutive on durations of the discontinuous reception configuration if the UE has failed to receive data for a threshold quantity of preceding on durations.

In some examples, the discontinuous reception configuration includes a first value for a discontinuous reception long cycle, and the UAI component 935 may be configured as or otherwise support a means for determining a second value for the discontinuous reception long cycle that is shorter than the first value for the discontinuous reception long cycle based on the speed of the UE being greater than a first mobility threshold, where the one or more parameters include at least the second value for the discontinuous reception long cycle.

In some examples, the discontinuous reception configuration includes a first value for a discontinuous reception long cycle, and the UAI component 935 may be configured as or otherwise support a means for determining an empty value or a second value for the discontinuous reception long cycle that is longer than the first value for the discontinuous reception long cycle based on the speed of the UE being less than a second mobility threshold, where the one or more parameters include at least the empty value or the second value for the discontinuous reception long cycle.

Additionally or alternatively, the communications manager 920 may support wireless communications at a UE in accordance with examples as disclosed herein. The WUS component 945 may be configured as or otherwise support a means for receiving, from a network node, first signaling configuring the UE to monitor for wake up signals for a discontinuous reception configuration. In some examples, the UAI component 935 may be configured as or otherwise support a means for transmitting, to the network node, UAI requesting one or more parameters to update the discontinuous reception configuration in response to the first signaling configuring the UE to monitor for the wake up signals. In some examples, the configuration component 940 may be configured as or otherwise support a means for receiving, from the network node and in response to the UAI, second signaling configuring the discontinuous reception configuration with the requested one or more parameters.

In some examples, the discontinuous reception configuration includes a first value for a discontinuous reception long cycle, and the UAI component 935 may be configured as or otherwise support a means for determining a second value for the discontinuous reception long cycle that is shorter than the first value for the discontinuous reception long cycle based on the UE being configured to monitor for the wake up signals. The one or more parameters may include at least the second value for the discontinuous reception long cycle and the discontinuous reception long cycle may indicate a time duration between starts of consecutive on durations of the discontinuous reception configuration if the UE has failed to receive data for a threshold quantity of preceding on durations.

In some examples, the WUS component 945 may be configured as or otherwise support a means for receiving third signaling configuring the UE to refrain from monitoring for the wake up signals for the discontinuous reception configuration. In some examples, the UAI component 935 may be configured as or otherwise support a means for determining an empty value or a third value for the discontinuous reception long cycle that is longer than the second value for the discontinuous reception long cycle based on the UE being configured to refrain from monitoring for the wake up signals. In some examples, the UAI component 935 may be configured as or otherwise support a means for transmitting second UAI requesting one or more second parameters to update the discontinuous reception configuration in response to the third signaling configuring the UE to refrain from monitoring for the wake up signals, the one or more second parameters including at least the empty value or the third value for the discontinuous reception long cycle.

In some examples, the UAI component 935 may be configured as or otherwise support a means for determining a value for a discontinuous reception long cycle of the discontinuous reception configuration based on a quality of service delay threshold, where the one or more parameters include at least the value for the discontinuous reception long cycle.

In some examples, the quality of service component 965 may be configured as or otherwise support a means for determining the quality of service delay threshold based on the UE being configured to monitor for the wake up signals.

In some examples, the WUS component 945 may be configured as or otherwise support a means for monitoring for a wake up signal prior to an on duration of the discontinuous reception configuration based on the UE being configured to monitor for the wake up signals. In some examples, the WUS component 945 may be configured as or otherwise support a means for receiving the wake up signal based on the monitoring. In some examples, the wake up component 955 may be configured as or otherwise support a means for performing a wake up procedure for the on duration of the discontinuous reception configuration based on receiving the wake up signal.

In some examples, the WUS component 945 may be configured as or otherwise support a means for monitoring for a wake up signal prior to an on duration of the discontinuous reception configuration based on the UE being configured to monitor for the wake up signals. In some examples, the WUS component 945 may be configured as or otherwise support a means for failing to receive the wake up signal based on the monitoring. In some examples, the wake up component 955 may be configured as or otherwise support a means for refraining from performing a wake up procedure for the on duration of the discontinuous reception configuration based on failing to receive the wake up signal.

Figure 10:
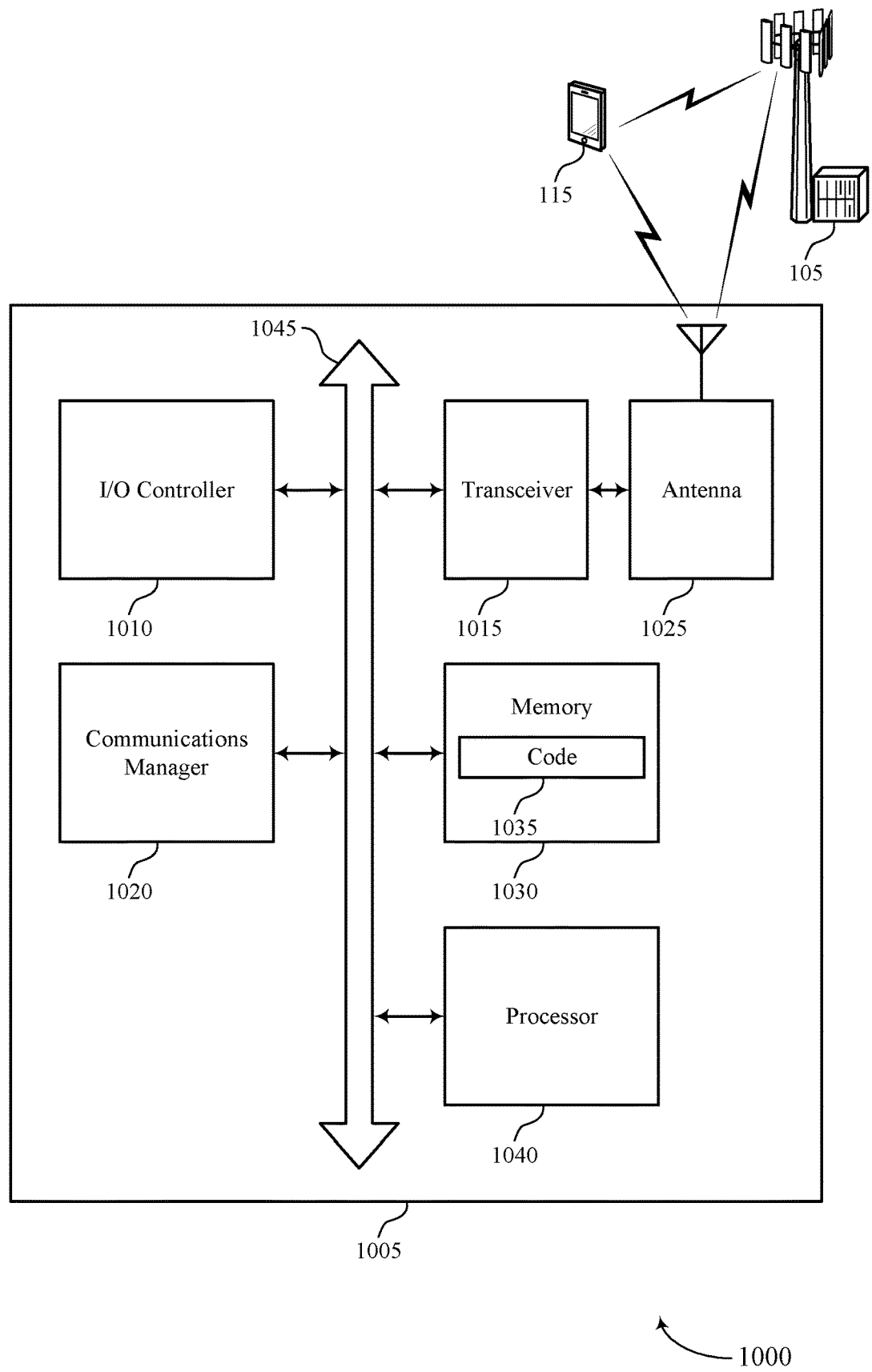
FIG. 10 shows a diagram of a system including a device that supports triggering UAI based on mobility and WUS configuration in accordance with aspects of the present disclosure.

FIG. 10 shows a diagram of a system 1000 including a device 1005 that supports triggering UAI based on mobility and WUS configuration in accordance with aspects of the present disclosure. The device 1005 may be an example of or include the components of a device 705, a device 805, or a UE 115 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting triggering UAI based on mobility and WUS configuration). For example, the device 1005 or a component of the device 1005 may include a processor 1040 and memory 1030 coupled with or to the processor 1040, the processor 1040 and memory 1030 configured to perform various functions described herein.

The communications manager 1020 may support wireless communications at a UE in accordance with examples as disclosed herein. For example, the communications manager 1020 may be configured as or otherwise support a means for communicating with a network node on a first channel according to a discontinuous reception configuration. The communications manager 1020 may be configured as or otherwise support a means for determining that a speed of the UE satisfies a mobility threshold. The communications manager 1020 may be configured as or otherwise support a means for transmitting, to the network node, UAI requesting one or more parameters to update the discontinuous reception configuration in response to determining that the speed satisfies the mobility threshold. The communications manager 1020 may be configured as or otherwise support a means for receiving, from the network node and in response to the UAI, signaling configuring the discontinuous reception configuration with the requested one or more parameters.

Additionally or alternatively, the communications manager 1020 may support wireless communications at a UE in accordance with examples as disclosed herein. For example, the communications manager 1020 may be configured as or otherwise support a means for receiving, from a network node, first signaling configuring the UE to monitor for wake up signals for a discontinuous reception configuration. The communications manager 1020 may be configured as or otherwise support a means for transmitting, to the network node, UAI requesting one or more parameters to update the discontinuous reception configuration in response to the first signaling configuring the UE to monitor for the wake up signals. The communications manager 1020 may be configured as or otherwise support a means for receiving, from the network node and in response to the UAI, second signaling configuring the discontinuous reception configuration with the requested one or more parameters.

By including or configuring the communications manager 1020 in accordance with examples as described herein, the device 1005 may support techniques for triggering UAI based on mobility and WUS configuration which may result in increased communication performance, reduced power consumption, and increased communication reliability, among other advantages.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of triggering UAI based on mobility and WUS configuration as described herein, or the processor 1040 and the memory 1030 may be otherwise configured to perform or support such operations.

Figure 11:
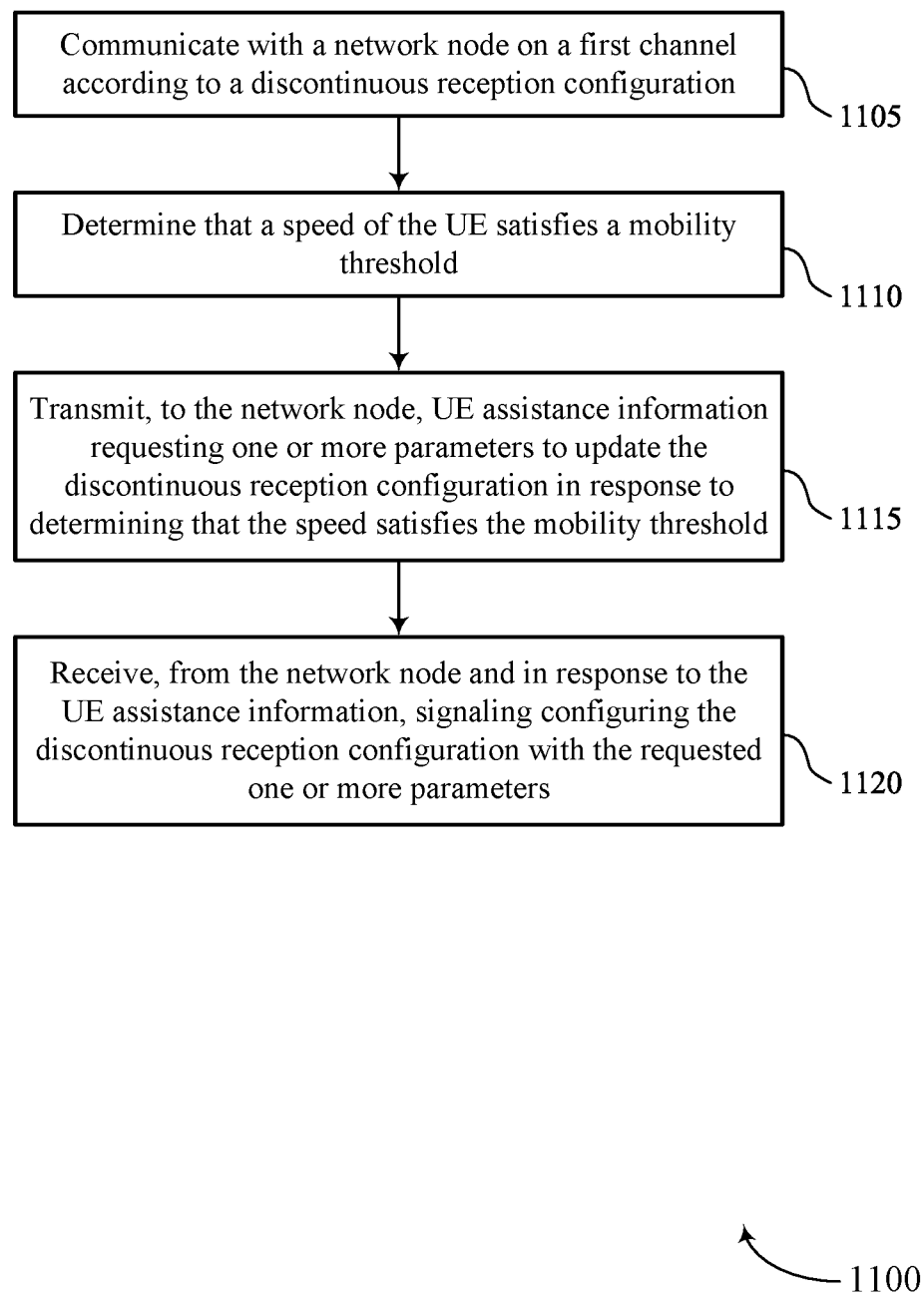
FIGS. 11 and 12 show flowcharts illustrating methods that support triggering UAI based on mobility and WUS configuration in accordance with aspects of the present disclosure.

FIG. 11 shows a flowchart illustrating a method 1100 that supports triggering UAI based on mobility and WUS configuration in accordance with aspects of the present disclosure. The operations of the method 1100 may be implemented by a UE or its components as described herein. For example, the operations of the method 1100 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1105, the method may include communicating with a network node on a first channel according to a discontinuous reception configuration. The operations of 1105 may be performed in accordance with examples as disclosed herein. In some examples, aspects of the operations of 1105 may be performed by a channel component 925 as described with reference to FIG. 9.

At 1110, the method may include determining that a speed of the UE satisfies a mobility threshold. The operations of 1110 may be performed in accordance with examples as disclosed herein. In some examples, aspects of the operations of 1110 may be performed by a speed component 930 as described with reference to FIG. 9.

At 1115, the method may include transmitting, to the network node, UAI requesting one or more parameters to update the discontinuous reception configuration in response to determining that the speed satisfies the mobility threshold. The operations of 1115 may be performed in accordance with examples as disclosed herein. In some examples, aspects of the operations of 1115 may be performed by a UAI component 935 as described with reference to FIG. 9.

At 1120, the method may include receiving, from the network node and in response to the UAI, signaling configuring the discontinuous reception configuration with the requested one or more parameters. The operations of 1120 may be performed in accordance with examples as disclosed herein. In some examples, aspects of the operations of 1120 may be performed by a configuration component 940 as described with reference to FIG. 9.

Figure 12:
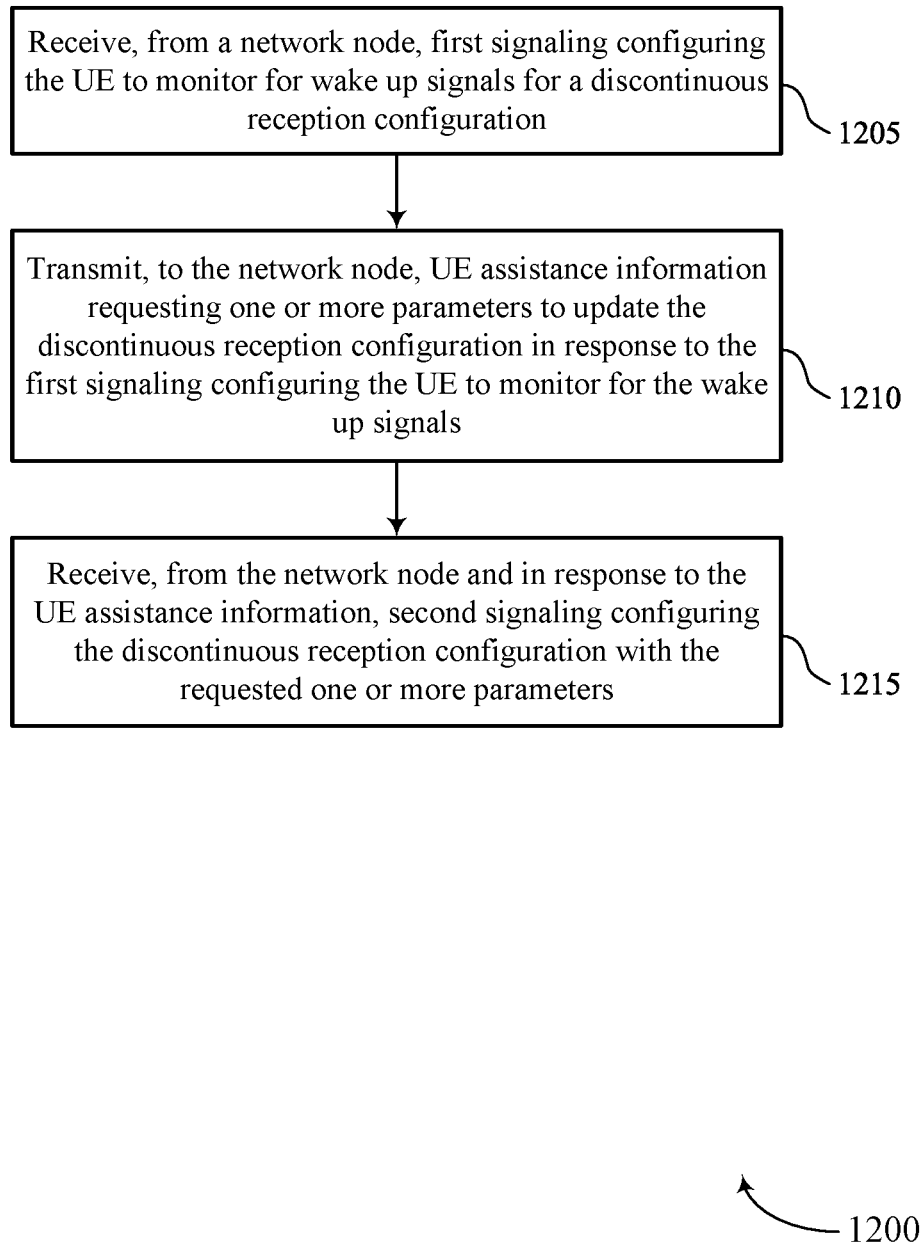

FIG. 12 shows a flowchart illustrating a method 1200 that supports triggering UAI based on mobility and WUS configuration in accordance with aspects of the present disclosure. The operations of the method 1200 may be implemented by a UE or its components as described herein. For example, the operations of the method 1200 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1205, the method may include receiving, from a network node, first signaling configuring the UE to monitor for wake up signals for a discontinuous reception configuration. The operations of 1205 may be performed in accordance with examples as disclosed herein. In some examples, aspects of the operations of 1205 may be performed by a WUS component 945 as described with reference to FIG. 9.

At 1210, the method may include transmitting, to the network node, UAI requesting one or more parameters to update the discontinuous reception configuration in response to the first signaling configuring the UE to monitor for the wake up signals. The operations of 1210 may be performed in accordance with examples as disclosed herein. In some examples, aspects of the operations of 1210 may be performed by a UAI component 935 as described with reference to FIG. 9.

At 1215, the method may include receiving, from the network node and in response to the UAI, second signaling configuring the discontinuous reception configuration with the requested one or more parameters. The operations of 1215 may be performed in accordance with examples as disclosed herein. In some examples, aspects of the operations of 1215 may be performed by a configuration component 940 as described with reference to FIG. 9.

The following provides an overview of aspects of the present disclosure:

Aspect 1: A method for wireless communications at a UE, comprising: communicating with a network node on a first channel according to a discontinuous reception configuration; determining that a speed of the UE satisfies a mobility threshold; transmitting, to the network node, UE assistance information requesting one or more parameters to update the discontinuous reception configuration in response to determining that the speed satisfies the mobility threshold; and receiving, from the network node and in response to the UE assistance information, signaling configuring the discontinuous reception configuration with the requested one or more parameters.

Aspect 2: The method of aspect 1, wherein the discontinuous reception configuration comprises a periodicity of on durations, the method further comprising: measuring a respective channel metric for one or more other channels based at least in part on the periodicity of the on durations for the discontinuous reception configuration.

Aspect 3: The method of aspect 2, wherein the discontinuous reception configuration comprises a first time duration between starts of consecutive on durations and the one or more parameters indicates a second time duration between the starts of the consecutive on durations that is less than the first time duration, the method further comprising: increasing a rate of performing the measuring based at least in part on the second time duration being less than the first time duration.

Aspect 4: The method of aspect 2, wherein the discontinuous reception configuration comprises a first time duration between starts of consecutive on durations and the one or more parameters indicates a second time duration between the starts of the consecutive on durations that is greater than the first time duration or refrains from indicating a time duration between the starts of the consecutive on durations, the method further comprising: decreasing a rate of performing the measuring based at least in part on the second time duration being greater than the first time duration or the one or more parameters refraining from indicating the time duration between the starts of the consecutive on durations.

Aspect 5: The method of any of aspects 2 through 4, wherein the measuring further comprises: measuring the respective channel metric for one or more other frequencies, one or more other cells, one or more other radio access technologies, or a combination thereof.

Aspect 6: The method of any of aspects 2 through 5, further comprising: performing a handover procedure to a second network node based at least in part on the measuring.

Aspect 7: The method of any of aspects 1 through 6, wherein determining that the speed of the UE satisfies the mobility threshold comprises: determining that a doppler frequency shift for the UE satisfies a threshold frequency shift.

Aspect 8: The method of any of aspects 1 through 7, wherein determining that the speed of the UE satisfies the mobility threshold comprises: determining that a rate of cell changes for the UE satisfies a threshold cell change rate.

Aspect 9: The method of any of aspects 1 through 8, wherein the one or more parameters comprises a preferred value for a discontinuous reception long cycle of the discontinuous reception configuration, the discontinuous reception long cycle indicating a time duration between starts of consecutive on durations of the discontinuous reception configuration if the UE has failed to receive data for a threshold quantity of preceding on durations.

Aspect 10: The method of any of aspects 1 through 3 and 5 through 9, wherein the discontinuous reception configuration comprises a first value for a discontinuous reception long cycle, the method further comprising: determining a second value for the discontinuous reception long cycle that is shorter than the first value for the discontinuous reception long cycle based at least in part on the speed of the UE being greater than a first mobility threshold, wherein the one or more parameters comprise at least the second value for the discontinuous reception long cycle.

Aspect 11: The method of any of aspects 1 through 2 and 4 through 9, wherein the discontinuous reception configuration comprises a first value for a discontinuous reception long cycle, the method further comprising: determining an empty value or a second value for the discontinuous reception long cycle that is longer than the first value for the discontinuous reception long cycle based at least in part on the speed of the UE being less than a second mobility threshold, wherein the one or more parameters comprise at least the empty value or the second value for the discontinuous reception long cycle.

Aspect 12: A method for wireless communications at a UE, comprising: receiving, from a network node, first signaling configuring the UE to monitor for wake up signals for a discontinuous reception configuration; transmitting, to the network node, UE assistance information requesting one or more parameters to update the discontinuous reception configuration in response to the first signaling configuring the UE to monitor for the wake up signals; and receiving, from the network node and in response to the UE assistance information, second signaling configuring the discontinuous reception configuration with the requested one or more parameters.

Aspect 13: The method of aspect 12, wherein the discontinuous reception configuration comprises a first value for a discontinuous reception long cycle, the method further comprising: determining a second value for the discontinuous reception long cycle that is shorter than the first value for the discontinuous reception long cycle based at least in part on the UE being configured to monitor for the wake up signals, wherein the one or more parameters comprise at least the second value for the discontinuous reception long cycle and wherein the discontinuous reception long cycle indicates a time duration between starts of consecutive on durations of the discontinuous reception configuration if the UE has failed to receive data for a threshold quantity of preceding on durations.

Aspect 14: The method of aspect 13, further comprising: receiving third signaling configuring the UE to refrain from monitoring for the wake up signals for the discontinuous reception configuration; determining an empty value or a third value for the discontinuous reception long cycle that is longer than the second value for the discontinuous reception long cycle based at least in part on the UE being configured to refrain from monitoring for the wake up signals; and transmitting second UE assistance information requesting one or more second parameters to update the discontinuous reception configuration in response to the third signaling configuring the UE to refrain from monitoring for the wake up signals, the one or more second parameters comprising at least the empty value or the third value for the discontinuous reception long cycle.

Aspect 15: The method of any of aspects 12 through 14, further comprising: determining a value for a discontinuous reception long cycle of the discontinuous reception configuration based at least in part on a quality of service delay threshold, wherein the one or more parameters comprise at least the value for the discontinuous reception long cycle.

Aspect 16: The method of aspect 15, further comprising: determining the quality of service delay threshold based at least in part on the UE being configured to monitor for the wake up signals.

Aspect 17: The method of any of aspects 12 through 16, further comprising: monitoring for a wake up signal prior to an on duration of the discontinuous reception configuration based at least in part on the UE being configured to monitor for the wake up signals; receiving the wake up signal based at least in part on the monitoring; and performing a wake up procedure for the on duration of the discontinuous reception configuration based at least in part on receiving the wake up signal.

Aspect 18: The method of any of aspects 12 through 16, further comprising: monitoring for a wake up signal prior to an on duration of the discontinuous reception configuration based at least in part on the UE being configured to monitor for the wake up signals; failing to receive the wake up signal based at least in part on the monitoring; and refraining from performing a wake up procedure for the on duration of the discontinuous reception configuration based at least in part on failing to receive the wake up signal.

Aspect 19: An apparatus for wireless communications at a UE, comprising a processor; memory coupled with the processor; and instructions stored in the memory and executable by the processor to cause the apparatus to perform a method of any of aspects 1 through 11.

Aspect 20: An apparatus for wireless communications at a UE, comprising at least one means for performing a method of any of aspects 1 through 11.

Aspect 21: A non-transitory computer-readable medium storing code for wireless communications at a UE, the code comprising instructions executable by a processor to perform a method of any of aspects 1 through 11.

Aspect 22: An apparatus for wireless communications at a UE, comprising a processor; memory coupled with the processor; and instructions stored in the memory and executable by the processor to cause the apparatus to perform a method of any of aspects 12 through 18.

Aspect 23: An apparatus for wireless communications at a UE, comprising at least one means for performing a method of any of aspects 12 through 18.

Aspect 24: A non-transitory computer-readable medium storing code for wireless communications at a UE, the code comprising instructions executable by a processor to perform a method of any of aspects 12 through 18.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:
   a processor;
   memory coupled with the processor; and
   instructions stored in the memory and executable by the processor to cause the apparatus to:
      communicate with a network node on a first channel according to a discontinuous reception configuration;
      transmit, to the network node, UE assistance information requesting one or more parameters to update the discontinuous reception configuration in response to a mobility of the UE satisfying a mobility threshold; and
      receive, from the network node and in response to the UE assistance information, signaling configuring the discontinuous reception configuration with the requested one or more parameters.

2. The apparatus of claim 1, wherein the discontinuous reception configuration comprises a periodicity of on durations, and the instructions are further executable by the processor to cause the apparatus to:
   measure a respective channel metric for one or more other channels based at least in part on the periodicity of the on durations for the discontinuous reception configuration.

3. The apparatus of claim 2, wherein the discontinuous reception configuration comprises a first time duration between starts of consecutive on durations and the one or more parameters indicates a second time duration between the starts of the consecutive on durations that is less than the first time duration, and the instructions are further executable by the processor to cause the apparatus to:
   increase a rate of performing the measuring based at least in part on the second time duration being less than the first time duration.

4. The apparatus of claim 2, wherein the discontinuous reception configuration comprises a first time duration between starts of consecutive on durations and the one or more parameters indicates a second time duration between the starts of the consecutive on durations that is greater than the first time duration or refrains from indicating a time duration between the starts of the consecutive on durations, and the instructions are further executable by the processor to cause the apparatus to:
   decrease a rate of performing the measuring based at least in part on the second time duration being greater than the first time duration or the one or more parameters refraining from indicating the time duration between the starts of the consecutive on durations.

5. The apparatus of claim 2, wherein the instructions to measure are further executable by the processor to cause the apparatus to:
   measure the respective channel metric for one or more other frequencies, one or more other cells, one or more other radio access technologies, or a combination thereof.

6. The apparatus of claim 2, wherein the instructions are further executable by the processor to cause the apparatus to:
   perform a handover procedure to a second network node based at least in part on the measuring.

7. The apparatus of claim 1, wherein the instructions are further executable by the processor to cause the apparatus to:
   determine that a doppler frequency shift for the UE satisfies a threshold frequency shift, wherein the mobility of the UE satisfies the mobility threshold based at least in part on the doppler frequency shift satisfying the threshold frequency shift.

8. The apparatus of claim 1, wherein the instructions are further executable by the processor to cause the apparatus to:

determine that a rate of cell changes for the UE satisfies a threshold cell change rate, wherein the mobility of the UE satisfies the mobility threshold based at least in part on the rate of cell changes satisfying the threshold cell change rate.

9. The apparatus of claim 1, wherein the one or more parameters comprises a preferred value for a discontinuous reception long cycle of the discontinuous reception configuration, the discontinuous reception long cycle indicating a time duration between starts of consecutive on durations of the discontinuous reception configuration if the UE has failed to receive data for a threshold quantity of preceding on durations.

10. The apparatus of claim 1, wherein the discontinuous reception configuration comprises a first value for a discontinuous reception long cycle, and the instructions are further executable by the processor to cause the apparatus to:
 determine a second value for the discontinuous reception long cycle that is shorter than the first value for the discontinuous reception long cycle based at least in part on the mobility of the UE being greater than a first mobility threshold, wherein the one or more parameters comprise at least the second value for the discontinuous reception long cycle.

11. The apparatus of claim 1, wherein the discontinuous reception configuration comprises a first value for a discontinuous reception long cycle, and the instructions are further executable by the processor to cause the apparatus to:
 determine an empty value or a second value for the discontinuous reception long cycle that is longer than the first value for the discontinuous reception long cycle based at least in part on the mobility of the UE being less than a second mobility threshold, wherein the one or more parameters comprise at least the empty value or the second value for the discontinuous reception long cycle.

12. An apparatus for wireless communications at a user equipment (UE), comprising:
 a processor;
 memory coupled with the processor; and
 instructions stored in the memory and executable by the processor to cause the apparatus to:
  receive, from a network node, first signaling configuring the UE to monitor for wake up signals for a discontinuous reception configuration;
  transmit, to the network node, UE assistance information requesting one or more parameters to update the discontinuous reception configuration in response to the first signaling configuring the UE to monitor for the wake up signals; and
  receive, from the network node and in response to the UE assistance information, second signaling configuring the discontinuous reception configuration with the requested one or more parameters.

13. The apparatus of claim 12, wherein the discontinuous reception configuration comprises a first value for a discontinuous reception long cycle, and the instructions are further executable by the processor to cause the apparatus to:
 determine a second value for the discontinuous reception long cycle that is shorter than the first value for the discontinuous reception long cycle based at least in part on the UE being configured to monitor for the wake up signals, wherein the one or more parameters comprise at least the second value for the discontinuous reception long cycle and wherein the discontinuous reception long cycle indicates a time duration between starts of consecutive on durations of the discontinuous reception configuration if the UE has failed to receive data for a threshold quantity of preceding on durations.

14. The apparatus of claim 13, wherein the instructions are further executable by the processor to cause the apparatus to:
 receive third signaling configuring the UE to refrain from monitoring for the wake up signals for the discontinuous reception configuration;
 determine an empty value or a third value for the discontinuous reception long cycle that is longer than the second value for the discontinuous reception long cycle based at least in part on the UE being configured to refrain from monitoring for the wake up signals; and
 transmit second UE assistance information requesting one or more second parameters to update the discontinuous reception configuration in response to the third signaling configuring the UE to refrain from monitoring for the wake up signals, the one or more second parameters comprising at least the empty value or the third value for the discontinuous reception long cycle.

15. The apparatus of claim 12, wherein the instructions are further executable by the processor to cause the apparatus to:
 determine a value for a discontinuous reception long cycle of the discontinuous reception configuration based at least in part on a quality of service delay threshold, wherein the one or more parameters comprise at least the value for the discontinuous reception long cycle.

16. The apparatus of claim 15, wherein the instructions are further executable by the processor to cause the apparatus to:
 determine the quality of service delay threshold based at least in part on the UE being configured to monitor for the wake up signals.

17. The apparatus of claim 12, wherein the instructions are further executable by the processor to cause the apparatus to:
 monitor for a wake up signal prior to an on duration of the discontinuous reception configuration based at least in part on the UE being configured to monitor for the wake up signals;
 receive the wake up signal based at least in part on the monitoring; and
 perform a wake up procedure for the on duration of the discontinuous reception configuration based at least in part on receiving the wake up signal.

18. The apparatus of claim 12, wherein the instructions are further executable by the processor to cause the apparatus to:
 monitor for a wake up signal prior to an on duration of the discontinuous reception configuration based at least in part on the UE being configured to monitor for the wake up signals;
 fail to receive the wake up signal based at least in part on the monitoring; and
 refrain from performing a wake up procedure for the on duration of the discontinuous reception configuration based at least in part on failing to receive the wake up signal.

19. A method for wireless communications at a user equipment (UE), comprising:
 communicating with a network node on a first channel according to a discontinuous reception configuration;
 transmitting, to the network node, UE assistance information requesting one or more parameters to update the discontinuous reception configuration in response to a mobility of the UE satisfying a mobility threshold; and receiving, from the network node and in response to the UE assistance information, signaling configuring the discontinuous reception configuration with the requested one or more parameters.

20. The method of claim 19, wherein the discontinuous reception configuration comprises a periodicity of on durations, the method further comprising:

measuring a respective channel metric for one or more other channels based at least in part on the periodicity of the on durations for the discontinuous reception configuration.

* * * * *